US012787109B2

(12) United States Patent
Mohammad Soleymani et al.

(10) Patent No.: US 12,787,109 B2
(45) Date of Patent: Nov. 3, 2026

(54) DRX ALIGNMENT FOR THE SIDELINK

(71) Applicant: Fraunhofer-Gesellschaft zur Foerderung der Angewandten Forschung e.V., Munich (DE)

(72) Inventors: Dariush Mohammad Soleymani, Erlangen (DE); Martin Leyh, Erlangen (DE); Elke Roth-Mandutz, Erlangen (DE); Shubhangi Bhadauria, Erlangen (DE); Mehdi Harounabadi, Erlangen (DE); Dietmar Lipka, Erlangen (DE); Prasanth Karunakaran, Erlangen (DE); Julian Popp, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 642 days.

(21) Appl. No.: 18/155,557

(22) Filed: Jan. 17, 2023

(65) Prior Publication Data

US 2023/0199909 A1 Jun. 22, 2023

Related U.S. Application Data

(63) Continuation of application No. PCT/EP2021/070039, filed on Jul. 16, 2021.

(30) Foreign Application Priority Data

Jul. 17, 2020 (EP) .................................... 20186586
Mar. 10, 2021 (EP) .................................... 21161871

(51) Int. Cl.

| | |
|---|---|
| ***H04W 76/28*** | (2018.01) |
| ***H04B 1/38*** | (2015.01) |
| ***H04W 92/18*** | (2009.01) |

(52) U.S. Cl.
CPC ............... *H04W 76/28* (2018.02); *H04B 1/38* (2013.01); *H04W 92/18* (2013.01)

(58) Field of Classification Search
None
See application file for complete search history.

(56) References Cited

U.S. PATENT DOCUMENTS

2016/0044740 A1 2/2016 Siomina et al.
2017/0188411 A1* 6/2017 Siomina ............ H04W 52/0216

FOREIGN PATENT DOCUMENTS

EP 3171528 A1 5/2017
WO 2015169406 A1 11/2015

(Continued)

OTHER PUBLICATIONS

LG Electronics, "Discussion on Rel-16 5G V2X WI leftovers for Rel-17 NR sidelink enhancement WI", 3GPP Draft; RP-200857, 3rd Generation Partnership Project (3GPP), Mobile Competence Centre;, 650, Route Des Lucioles; F-06921 Sophia-Antipolis Cedex ; France, TSG RAN, No. Electronic Meeting; Jun. 29, 2020-Jul. 3, 2020, Jun. 22, 2020 (Jun. 22, 2020), XP051903557—5 pages.

(Continued)

*Primary Examiner* — Walter J Divito
(74) *Attorney, Agent, or Firm* — Ashurst Perkins Coie US LLP; Michael A. Glenn

(57) ABSTRACT

Embodiments provide a transceiver of a wireless communication system, wherein the transceiver is configured to operate in a sidelink in-coverage, out of coverage or partial coverage scenario, in which resources for a sidelink communication over a sidelink are pre-configured by the wireless communication system or allocated or scheduled autonomously by the transceiver, wherein the transceiver is configured to receive, in the sidelink in-coverage, out of coverage or partial coverage scenario, sidelink signals using a discontinuous reception, DRX, mode of operation, (Continued)

wherein at least one parameter of the discontinuous reception, DRX, mode of operation depends on at least one operating parameter of the transceiver.

19 Claims, 15 Drawing Sheets

(56) References Cited

FOREIGN PATENT DOCUMENTS

| | | | |
|---|---|---|---|
| WO | 2018016882 | A1 | 1/2018 |
| WO | 2018082541 | A1 | 5/2018 |
| WO | 2019034378 | A1 | 2/2019 |
| WO | 2020140815 | A1 | 7/2020 |

OTHER PUBLICATIONS

3GPP TS 36.306, V16.0.0 (Mar. 2020), 3rd Generation Partnership Project; Technical Specification Group Radio Access Network; Evolved Universal Terrestrial Radio Access (E-UTRA); User Equipment (UE) radio access capabilities (Release 16) (128 pages).
3GPP TS 38.212 V16.1.0 (Mar. 2020), 3rd Generation Partnership Project; Technical Specification Group Radio Access Network; NR; Multiplexing and channel coding (Release 16) (146 pages).
3GPP TS 38.300 G20 V16.2.0 (Jul. 2020), 3rd Generation Partnership Project; Technical Specification Group Radio Access Network; NR; NR and NG-RAN Overall Description; Stage 2 (Release 16) (148 pages).
3GPP TS 38.300 V16.1.0 (Mar. 2020), 3rd Generation Partnership Project; Technical Specification Group Radio Access Network; NR; NR and NG-RAN Overall Description; Stage 2 (Release 16) (133 pages).
3GPP TS 38.304 V16.0.0 (Mar. 2020), 3rd Generation Partnership Project; Technical Specification Group Radio Access Network; NR; User Equipment (UE) procedures in Idle mode and RRC Inactive state (Release 16) (38 pages).
3GPP TS 38.321 V16.0.0 (Mar. 2020), 3rd Generation Partnership Project; Technical Specification Group Radio Access Network; NR; Medium Access Control (MAC) protocol specification (Release 16) (141 pages).
3GPP TS 38.331 V16.0.0 (Mar. 2020), 3rd Generation Partnership Project; Technical Specification Group Radio Access Network; NR; Radio Resource Control (RRC) protocol specification (Release 16) (835 pages).
Ericsson, "Techniques for UE Power Saving", Tdoc R1-1902935, 3GPP TSG-RAN WG1 Meeting #96, Athens, Greece, Feb. 25-Mar. 1, 2019 (15 pages).
ETSI TS 102 637-2 V1.2.1 (Mar. 2011), Intelligent Transport Systems (ITS); Vehicular Communications; Basic Set of Applications; Part 2: Specification of Cooperative Awareness Basic Service (18 pages).
Fraunhofer Hhi et al, "Other Sidelink Aspects Impacting RAN1", vol. RAN WG1, No. e-Meeting; Oct. 26, 2020-Nov. 13 2020, (Oct. 23, 2020), 3GPP Draft; R1-2008758, XP051945370 (3 pages).
Fraunhofer Iis et al, "General Principle of NR SL DRX", vol. RAN WG2, No. Online; Jan. 25, 2021-Feb. 5, 2021, (Jan. 14, 2021), 3GPP Draft; R2-2100573, XP051972698 (4 pages).
LG Electronics, "New WID on NR sidelink enhancement", RP-193231, 3GPP TSG RAN Meeting #86, Sitges, Spain, Dec. 9-12, 2019 (6 pages).
Vivo, "Views on general NR sidelink enhancements in Rel-17", vol. TSG RAN, No. Sitges, ES; Dec. 9, 2019-Dec. 12, 2019, (Dec. 2, 2019), 3GPP Draft; RP-192542, XP051834183 (4 pages).
ZTE, R1-1900226, on adaptation aspects for NR UE power consumption reduction, 3GPP RAN1 Adhoc meeting #1901, Jan. 2019 (13 pages).
3GPP TS 36.300, V16.1.0, Mar. 2020, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16) (386 pages).
3GPP TSG RAN \wg2_r12 Mar. 25, 2017 R2-1703593—discussion on paging relay and sidelink maintenance (1 page).
3GPP TSG RAN\wg2_r12 May 6, 2017 "R2-1705126—Sidelink maintenance for evolved L2 relay" 1-20 A (4 pages).

* cited by examiner

DRX cycle for SL - in line with UL/DL adaptive SL on duration in DRX cycle for e.g. P-UEs

DRX ALIGNMENT FOR THE SIDELINK

CROSS-REFERENCES TO RELATED APPLICATIONS

This application is a continuation of copending International Application No. PCT/EP2021/070039, filed Jul. 16, 2021, which is incorporated herein by reference in its entirety, and additionally claims priority from European Applications Nos. EP 20 186 586.2, filed Jul. 17, 2020, and EP 21 161 871.5, filed Mar. 10, 2021, all of which are incorporated herein by reference in their entirety.

BACKGROUND OF THE INVENTION

Embodiments of the present application relate to the field of wireless communication, and more specifically, to DRX alignment for the sidelink.

FIG. 1 is a schematic representation of an example of a terrestrial wireless network 100 including, as is shown in FIG. 1(*a*), a core network 102 and one or more radio access networks RAN1, RAN2, . . . RANN. FIG. 1(*b*) is a schematic representation of an example of a radio access network RANn that may include one or more base stations gNB1 to gNB5, each serving a specific area surrounding the base station schematically represented by respective cells 1061 to 1065. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(*b*) shows an exemplary view of five cells, however, the RANn may include more or less such cells, and RANn may also include only one base station. FIG. 1(*b*) shows two users UE1 and UE2, also referred to as user equipment, UE, that are in cell 1062 and that are served by base station gNB2. Another user UE3 is shown in cell 1064 which is served by base station gNB4. The arrows 1081, 1082 and 1083 schematically represent uplink/downlink connections for transmitting data from a user UE1, UE2 and UE3 to the base stations gNB2, gNB4 or for transmitting data from the base stations gNB2, gNB4 to the users UE1, UE2, UE3. Further, FIG. 1(*b*) shows two IoT devices 1101 and 1102 in cell 1064, which may be stationary or mobile devices. The IoT device 1101 accesses the wireless communication system via the base station gNB4 to receive and transmit data as schematically represented by arrow 1121. The IoT device 1102 accesses the wireless communication system via the user UE3 as is schematically represented by arrow 1122. The respective base station gNB1 to gNB5 may be connected to the core network 102, e.g., via the S1 interface, via respective backhaul links 1141 to 1145, which are schematically represented in FIG. 1(*b*) by the arrows pointing to "core". The core network 102 may be connected to one or more external networks. Further, some or all of the respective base station gNB1 to gNB5 may connected, e.g., via the S1 or X2 interface or the XN interface in NR, with each other via respective backhaul links 1161 to 1165, which are schematically represented in FIG. 1(*b*) by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB), the physical downlink shared channel (PDSCH) carrying for example a system information block (SIB), the physical downlink, uplink and sidelink control channels (PDCCH, PUCCH, PSSCH) carrying for example the downlink control information (DCI), the uplink control information (UCI) and the sidelink control information (SCI). For the uplink, the physical channels, or more precisely the transport channels according to 3GPP, may further include the physical random access channel (PRACH or RACH) used by UEs for accessing the network once a UE is synchronized and has obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g., 1 ms. Each subframe may include one or more slots of 12 or 14 OFDM symbols depending on the cyclic prefix (CP) length. All OFDM symbols may be used for DL or UL or only a subset, e.g., when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g., DFT-s-OFDM. Other waveforms, like non-orthogonal waveforms for multiple access, e.g., filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the NR (5G), New Radio, standard.

The wireless network or communication system depicted in FIG. 1 may by a heterogeneous network having distinct overlaid networks, e.g., a network of macro cells with each macro cell including a macro base station, like base station gNB1 to gNB5, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the NR (5G), new radio, standard.

In mobile communication networks, for example in a network like that described above with reference to FIG. 1, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs

- may not be connected to a base station, for example, they are not in an RRC connected state, so that the UEs do not receive from the base station any sidelink resource allocation configuration or assistance, and/or
- may be connected to the base station, but, for one or more reasons, the base station may not provide sidelink resource allocation configuration or assistance for the UEs, and/or may be connected to the base station that may not support NR V2X services, e.g., GSM, UMTS, LTE base stations.

When considering two UEs directly communicating with each other over the sidelink, e.g., using the PC5 interface, one of the UEs may also be connected with a BS, and may relay information from the BS to the other UE via the sidelink interface. The relaying may be performed in the same frequency band (in-band-relay) or another frequency band (out-of-band relay) may be used. In the first case, communication on the Uu and on the sidelink may be decoupled using different time slots as in time division duplex, TDD, systems.

FIG. 2 is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 3 is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is the out-of-coverage scenario does not necessarily mean that the respective mode 2 UEs (in NR) or mode 4 UEs (in LTE) are outside of the coverage 200 of a base station, rather, it means that the respective mode 2 UEs (in NR) or mode 4 UEs (in LTE) are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the NR mode 1 or LTE mode 3 UEs 202, 204 also NR mode 2 or LTE mode 4 UEs 206, 208, 210 are present.

Naturally, it is also possible that the first vehicle 202 is covered by the gNB, i.e. connected with Uu to the gNB, wherein the second vehicle 204 is not covered by the gNB and only connected via the PC5 interface to the first vehicle 202, or that the second vehicle is connected via the PC5 interface to the first vehicle 202 but via Uu to another gNB, as will become clear from the discussion of FIGS. 4 and 5.

FIG. 4 is a schematic representation of a scenario in which two UEs directly communicating with each, wherein only one of the two UEs is connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204, wherein only the first vehicle 202 is in the coverage area 200 of the base station gNB. Both vehicles 202, 204 are connected directly with each other over the PC5 interface.

FIG. 5 is a schematic representation of a scenario in which two UEs directly communicating with each, wherein the two UEs are connected to different base stations. The first base station gNB1 has a coverage area that is schematically represented by the first circle 2001, wherein the second station gNB2 has a coverage area that is schematically represented by the second circle 2002. The UEs directly communicating with each other include a first vehicle 202 and a second vehicle 204, wherein the first vehicle 202 is in the coverage area 2001 of the first base station gNB1 and connected to the first base station gNB1 via the Uu interface, wherein the second vehicle 204 is in the coverage area 2002 of the second base station gNB2 and connected to the second base station gNB2 via the Uu interface.

In a communication system as described above, such as Rel-16 NR, sidelink is designed for UEs (e.g. V-UEs) assuming that power consumption is no issue. Therefore, a UE supporting sidelink can be "always-on" without considering the need of DRX to save battery.

Therefore, solutions for power saving are required for UEs e.g. P-UEs like the vulnerable road users UEs (VRUs) in V2X use cases and for UEs in public safety and commercial use cases where power consumption in the UEs needs to be minimized to save battery.

1. DRX on the NR Uu Interface and LTE Sidelink

For power saving, DRX is known only on the NR Uu interface and LTE sidelink. However, for V2X or public safety applications on the sidelink until rel-16 NR, any UE category is considered to be "always-on". DRX to save power is not foreseen for any UE category or type, neither for vehicular-based UEs (V-UEs) nor battery based UEs, e.g. UEs of VRUs. However, V-UEs are connected to the vehicular power supply. Power consumption could therefore be less relevant for V-UEs. Different for pedestrians or cyclists using battery-based wearable UEs where power saving is crucial to ensure operability of e.g. sidelink based V2X applications over time.

1.2 DRX on the Uu Interface-LTE

In [5], section 10.1.4 the DRX in LTE was defined.

1.2.1 UEs in RRC CONNECTED Mode

The following definitions apply to DRX in E-UTRAN [5], except for NB-IoT:

- On-duration: duration in downlink subframes that the UE waits for, after waking up from DRX, to receive PDCCHs. If the UE successfully decodes a PDCCH, the UE stays awake and starts the inactivity timer;
- Inactivity-timer: duration in downlink subframes that the UE waits to successfully decode a PDCCH, from the last successful decoding of a PDCCH, failing which it re-enters DRX. The UE shall restart the inactivity timer following a single successful decoding of a PDCCH for a first transmission only (i.e. not for retransmissions).
- Active-time: total duration that the UE is awake. This includes the "on-duration" of the DRX cycle, the time UE is performing continuous reception while the inactivity timer has not expired and the time UE is performing continuous reception while waiting for a DL retransmission after one HARQ RTT (Round Trip Time) or, for asynchronous UL HARQ operation, for an UL retransmission grant after one UL HARQ RTT. Based on the above the minimum active time is of length equal to on-duration, and the maximum is undefined (infinite)

Of the above parameters the on-duration and inactivity-timer are of fixed lengths, while the active-time is of varying lengths based on scheduling decision and UE decoding success.

Only on-duration and inactivity-timer duration are signaled to the UE by the eNB:

- There is only one DRX configuration applied in the UE at any time;
- UE shall apply an on-duration on wake-up from DRX sleep;
- New transmissions can only take place during the active-time (so that when the UE is waiting for one retransmission only, it does not have to be "awake" during the RTT).
- If PDCCH has not been successfully decoded during the on-duration, the UE shall follow the DRX configuration (i.e. the UE can enter DRX sleep if allowed by the DRX configuration):
- Except for NB-IoT, if it successfully decodes a PDCCH for a first transmission, the UE shall stay awake and start the inactivity timer (even if a PDCCH is successfully decoded in the sub-frames where the UE has also been allocated predefined resources) until a MAC control message tells the UE to re-enter DRX, or until the inactivity timer expires. In both cases, the DRX cycle that the UE follows after re-entering DRX is given by the following rules:
  - If a short DRX cycle is configured; the UE first follows the short DRX cycle and after a longer period of inactivity the UE follows the long DRX cycle;
  - Else the UE follows the long DRX cycle directly.

In order to enable reasonable UE battery consumption, DRX in E-UTRAN is characterized by the following:

- Per UE mechanism (as opposed to per radio bearer);
- No RRC or MAC sub state to distinguish between different levels of DRX;
- Available long DRX cycles are controlled by the network and start from non-DRX up to 10.24 seconds;
- Measurement requirement and reporting criteria can differ according to the length of the DRX interval i.e. long DRX intervals may experience more relaxed requirements;
- When DRX is configured, the UE may be further configured with an "on-duration" timer during which time the UE monitors the PDCCHs for possible allocations;
- When DRX is configured, periodic CQI reports can only be sent by the UE during the "active-time". RRC can further restrict periodic CQI reports so that they are only sent during the on-duration.

1.2.2 UEs in RRC Idle Mode

When extended DRX (eDRX) is used in idle mode, the following are applicable:

- The DRX cycle is extended beyond 10.24s in idle mode, with a maximum value of 2621.44 seconds (43.69 minutes); For NB-IoT, the maximum value of the DRX cycle is 10485.76 seconds (2.91 hours).

1.3 DRX on the Uu Interface—New Radio (NR) Release-15/16

For different modes of a UE the following procedures are considered for power saving using DRX, as will be described in the following.

1.3.1 UEs in RRC Connected Mode

The PDCCH monitoring activity of the UE in RRC connected mode is governed by DRX and BA (bandwidth adaptation).

When DRX is configured, the UE does not have to continuously monitor PDCCH. DRX is characterized by the following:

- On-duration: duration that the UE waits for, after waking up, to receive PDCCHs. If the UE successfully decodes a PDCCH, the UE stays awake and starts the inactivity timer;
- Inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (i.e. not for retransmissions);
- retransmissiontimer: duration until a retransmission can be expected;
- Cycle: specifies the periodic repetition of the on-duration followed by a possible period of inactivity (see FIG. 6); The DRX cycle length can be adjusted for the purpose of delay budget reporting (if preferred by the UE; singled in UEAssistanceInformation
- Active-time: total duration that the UE monitors PDCCH. This includes the "on-duration" of the DRX cycle, the time UE is performing continuous reception while the inactivity timer has not expired, and the time when the UE is performing continuous reception while waiting for a transmission opportunity.

FIG. 6 shows in a diagram a schematic illustration of an example of a DRX cycle.

A more detailed example of the C-DRX in Rel 15 is described in [6] and is reproduced in FIG. 7. Specifically, FIG. 7 shows in a diagram a schematic illustration of a Rel. 15 (NR) C-DRX example [6].

More specifically, FIG. 7 is an example with DRX parameters of {drx-Inactivity Timer=3 ms, drx-onDuration Timer=2 ms, drx-ShortCycle=5 ms, drx-LongCycleStartoffset=[10 ms, 0 ms], drx-ShortCycle Timer=6}. For the slot location of {0, 0}, a UL/DL scheduling is granted. Then, a drx-Inactivity Timer is triggered and lasts for 3 slots (drx-InactivityTimer=3 ms). UE keeps monitoring the PDCCH until the Inactivity Timer expires. When the drx-Inactivity Timer expires, the UE can go into sleep state and power consumption reduction can be achieved. A drx-onDuration-Timer is configured for each DRX cycle. As shown in FIG. 4, the DRX operation starts from slots of {0, 0} with cycle of 5 slots (drx-ShortCycle=5 ms). During the drx-onDuration Timer period, a UE shall monitor the PDCCH. A long DRX cycle will be triggered after 6 short DRX cycles (drx-ShortCycleTimer=6). The "Inactivity Timer" shall be restarted when there is a new data transmission or UL/DL scheduling.

Bandwidth adaptation is another power saving feature in Rel. 15. When BA (bandwidth adaptation) is configured, the UE only has to monitor PDCCH on the one active BWP, i.e. it does not have to monitor PDCCH on the entire DL frequency of the cell. A BWP inactivity timer (independent from the DRX inactivity-timer described above) is used to switch the active BWP to the default one: the timer is restarted upon successful PDCCH decoding and the switch to the default BWP takes place when it expires. Rel. 16 introduces a Wake-Up Signal (WUS) in conjunction with C-DRX for additional power saving. This WUS is a PDCCH (named Format 2_6 in NR terminology) scrambled using the following identity:

PS-RNTI: used to determine if the UE needs to monitor PDCCH on the next occurrence of the connected mode DRX on-duration The basic principle of the WUS is illustrated in [7]: If UE detects WUS in a WUS monitoring occasion (MO), then it will monitor PDCCH in the on duration, otherwise the UE may skip monitoring PDCCH in that on duration. FIG. 8 also illustrates an example mechanism by which the UE can go to sleep after receiving data (at expiry of Inactivity timer (IAT)).

FIG. 8 shows a schematic illustration of a Rel 16. WUS (DCI format 2_6) [7].

Important parameters relevant to WUS (DCI format 2_6) among other things include a wake-up indication bit [8, section 10.3] and a ps-offset:

the UE may not start the drx-onDuration Timer for the next long DRX cycle when a value of the Wake-up indication bit is '0', and the UE starts the drx-onDuration Timer for the next long DRX cycle when a value of the Wake-up indication bit is '1' an offset by ps-Offset indicating a time, where the UE starts monitoring PDCCH for detection of DCI format 2_6 according to the number of search space sets, prior to a slot where the drx-onDuration Timer would start on the PCell or on the SpCell The UE does not monitor PDCCH for detecting DCI format 2_6 (i.e., WUS) during Active Time [3].

Another feature in Rel. 15, an enhancement of which was also discussed in Rel. 16 power saving study, is the Go-To-Sleep (GTS) signaling. According to [7], go-to-sleep is a mechanism by which a gNB can send UE to sleep, for example, in C-DRX, UE can go to sleep when Inactivity timer expires. While there are several variants of GTS, it is noted that MAC based go-to-sleep is already supported in Rel-15. In MAC command-based mechanism, when UE is monitoring PDCCH, gNB can send it to DRX via explicit DRX MAC command CE by stopping the Inactivity and any on duration timers (see [3]). This mechanism as illustrated in [7] is depicted in FIG. 9.

In detail, FIG. 9 shows a schematic illustration of DRX operation using WUS and using Rel-15 DRX MAC command CE-based GTS [7].

1.3.2 UEs in RRC Inactive or RRC Idle Modes

During the Rel. 16 power saving study, it has been proposed to include a DCI based (i.e. layer 1 based) go-to-sleep signaling to complement the Rel. 15 MAC command control element based mechanism [7]. The Access and Mobility Management Function (AMF) provides to the Next Generation Radio Access technology Network (NG-RAN) node the core network assistance information to assist the NG-RAN node's decision whether the UE can be sent to RRC_INACTIVE. The core network assistance information includes the registration area configured for the UE, the "Periodic Registration Update" timer, and the UE "Identity Index" value, and may include the UE specific DRX, an indication if the UE is configured with Mobile Initiated Connection Only (MICO) mode by the AMF, and the expected UE behavior. The UE registration area is taken into account by the NG-RAN node when configuring the RAN-based Notification Area (RNA). The UE specific DRX and UE Identity Index value are used by the NG-RAN node for RAN paging. When the gNB decides to reconfigure the UE (e.g. with a new DRX cycle or RNA) or when the gNB decides to push the UE to RRC_IDLE, Signaling Radio Bearer (SRB) with at least integrity protection shall be used. Paging DRX is defined where the UE in RRC_IDLE or RRC_INACTIVE is only required to monitor paging channels during one Paging Occasion (PO) per DRX cycle (see TS 38.304).

In view of the above, solutions for power saving are required for UEs e.g. P-UEs like the vulnerable road users UEs (VRUs) in V2X use cases and for UEs in public safety and commercial use cases where power consumption in the UEs needs to be minimized to save battery.

It is noted that the information in the above section is only for enhancing the understanding of the background of the invention and therefore it may contain information that does not form conventional technology and is already known to a person of ordinary skill in the art.

SUMMARY

An embodiment may have a transceiver of a wireless communication system, wherein the transceiver is configured to operate in a sidelink in-coverage, out of coverage or partial coverage scenario, in which resources for a sidelink communication over a sidelink are pre-configured by the wireless communication system or allocated or scheduled autonomously by the transceiver, wherein the transceiver is configured to receive, in the sidelink in-coverage, out of coverage or partial coverage scenario, sidelink signals from at least one other transceiver of the wireless communication system using a discontinuous reception, DRX, mode of operation, wherein the transceiver is configured to adjust at least one parameter of a sidelink discontinuous reception, DRX, cycle describing periods during which sidelink signals are received in the discontinuous reception, DRX, mode of operation in dependence on at least one other discontinuous reception, DRX, cycle used by the at least one other transceiver, wherein the transceiver is configured to transmit a sidelink control signal to the at least one other transceiver, the sidelink control signal comprising an information describing the discontinuous reception, DRX, cycle used by the transceiver, wherein the transceiver is a user equipment.

Another embodiment may have a method for operating a transceiver of a wireless communication system, the method having the steps of: operating the transceiver in a sidelink in-coverage, out of coverage or partial coverage scenario, in which resources for a sidelink communication over a sidelink are pre-configured by the wireless communication system or allocated or scheduled autonomously by the transceiver, receiving, in the sidelink in-coverage, out of coverage or partial coverage scenario, sidelink signals from at least one other transceiver of the wireless communication system using a discontinuous reception, DRX, mode of operation, adjusting at least one parameter of a sidelink discontinuous reception, DRX, cycle describing periods during which sidelink signals are received in the discontinuous reception, DRX, mode of operation in dependence on at least one other discontinuous reception, DRX, cycle used by the at least one other transceiver, transmitting a sidelink control signal to the at least one other transceiver, the sidelink control signal comprising an information describing the discontinuous reception, DRX, cycle used by the transceiver, wherein the transceiver is a user equipment.

Another embodiment may have a non-transitory digital storage medium having a computer program stored thereon to perform the method for operating a transceiver of a wireless communication system, the method having the steps of: operating the transceiver in a sidelink in-coverage, out of coverage or partial coverage scenario, in which resources for a sidelink communication over a sidelink are pre-configured by the wireless communication system or allocated or scheduled autonomously by the transceiver, receiving, in the sidelink in-coverage, out of coverage or partial coverage scenario, sidelink signals from at least one other transceiver of the wireless communication system using a discontinuous reception, DRX, mode of operation, adjusting at least one parameter of a sidelink discontinuous reception, DRX, cycle describing periods during which sidelink signals are received in the discontinuous reception, DRX, mode of operation in dependence on at least one other discontinuous reception, DRX, cycle used by the at least one other transceiver, transmitting a sidelink control signal to the at least one other transceiver, the sidelink control signal comprising an information describing the discontinuous reception, DRX, cycle used by the transceiver, when said computer program is run by a computer, wherein the transceiver is a user equipment.

BRIEF DESCRIPTION OF THE DRAWINGS

Embodiments of the present invention will be detailed subsequently referring to the appended drawings, in which.

Figure 1A:
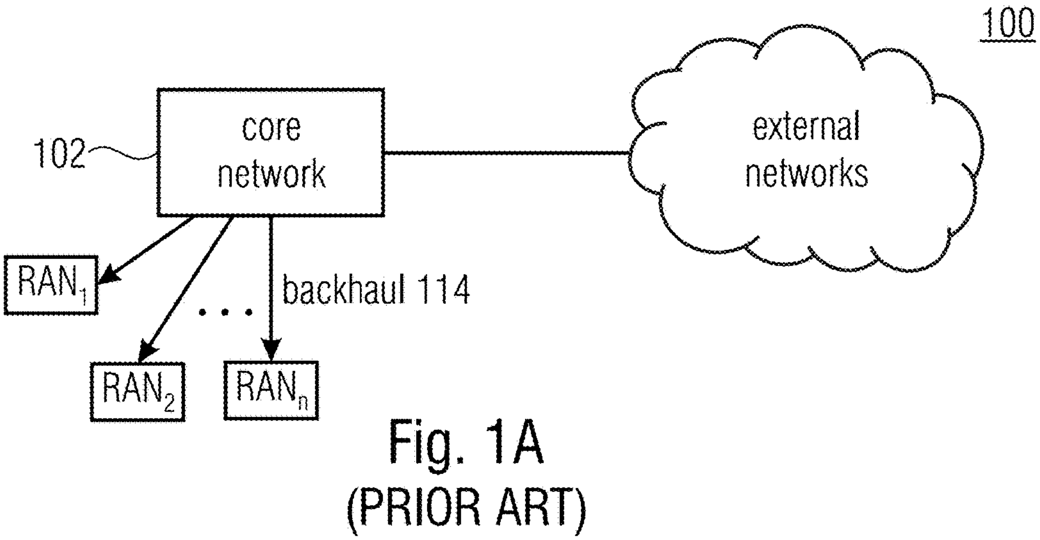
Fig. 1A (PRIOR ART)
FIG. 1*a-b* shows a schematic representation of an example of a wireless communication system.
Figure 1B:
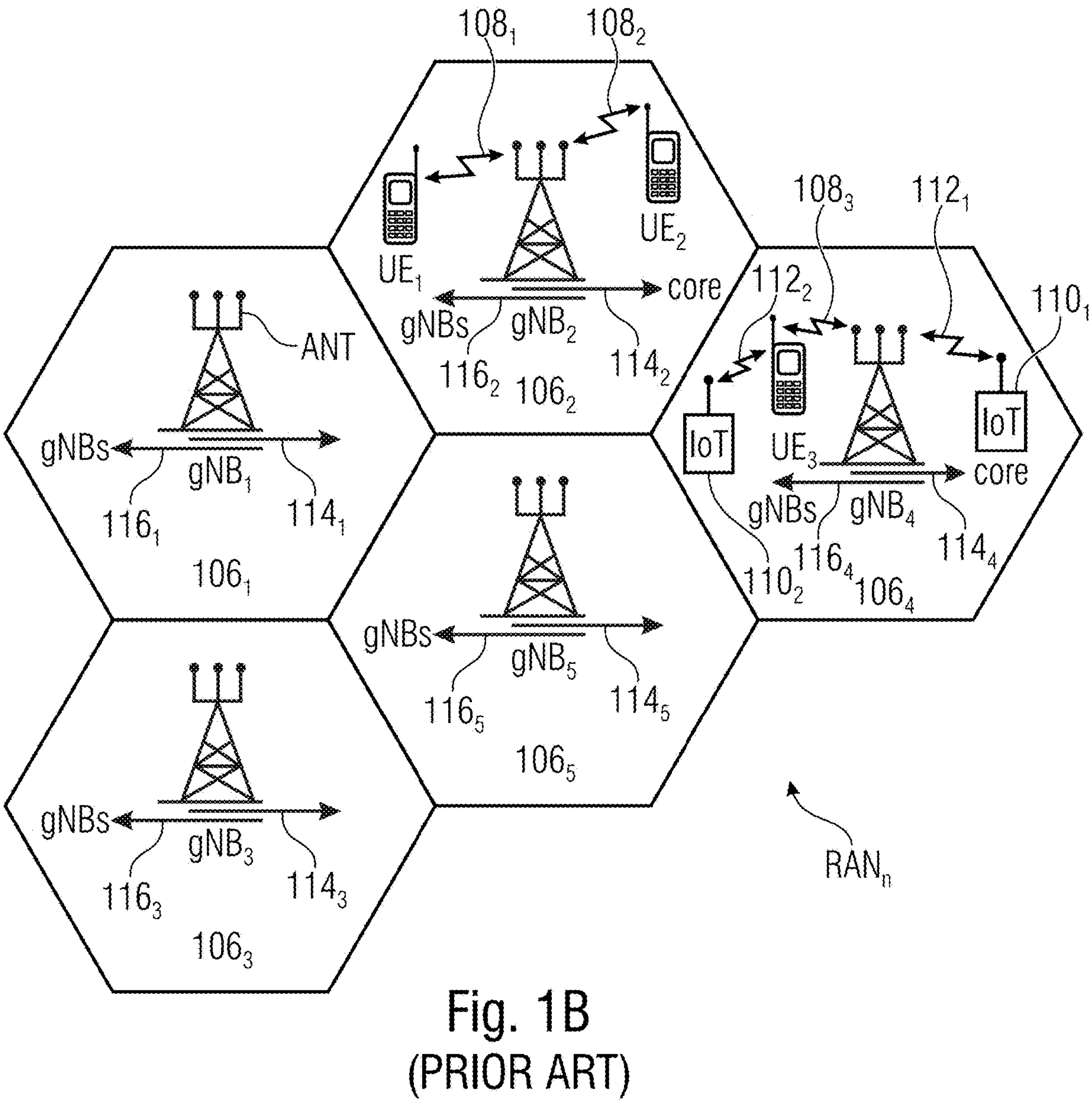
Fig. 1B (PRIOR ART)
Figure 2:
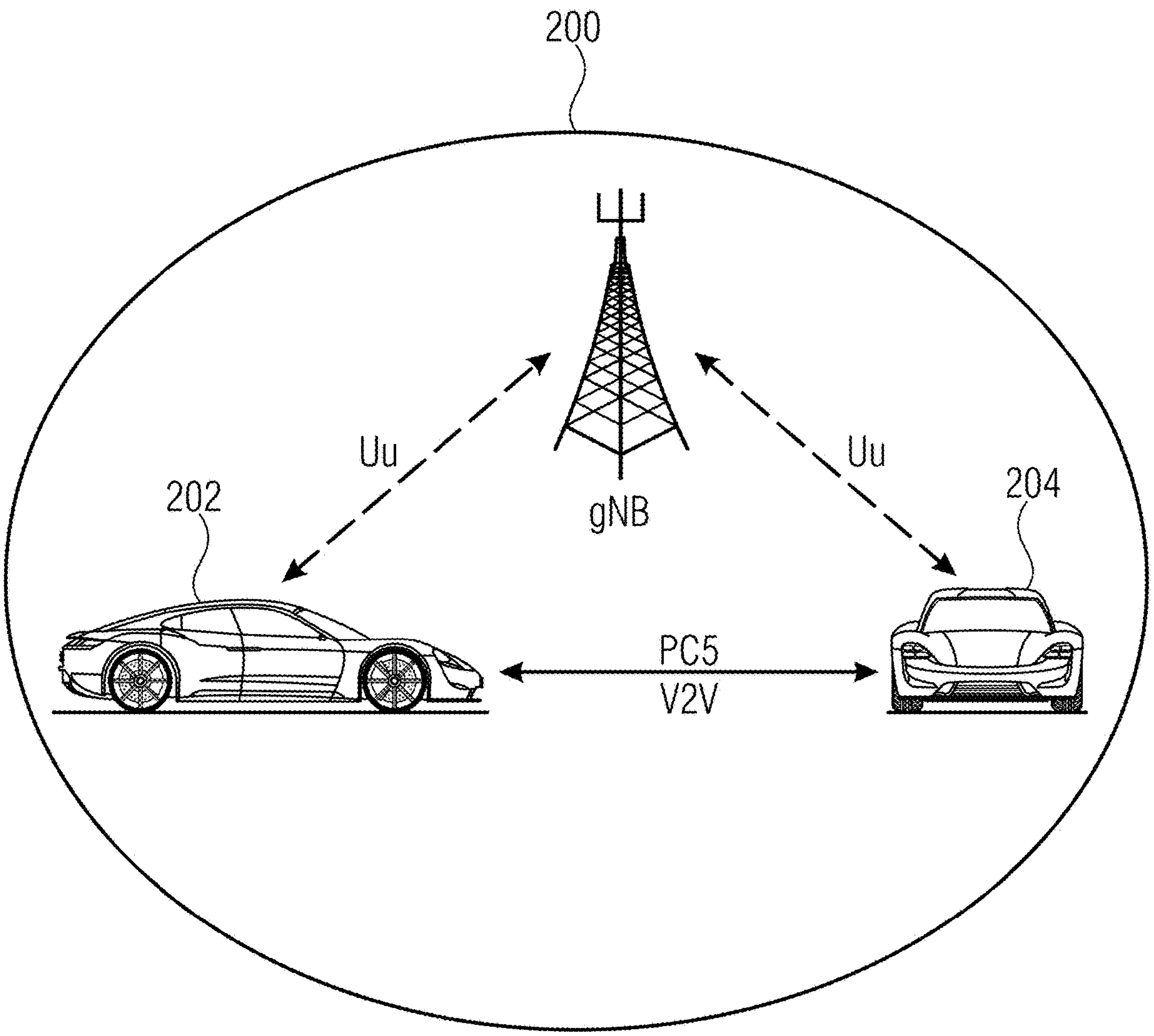
Fig. 2 (PRIOR ART)
FIG. 2 is a schematic representation of an in-coverage scenario in which UEs directly communicating with each other are connected to a base station.
Figure 3:
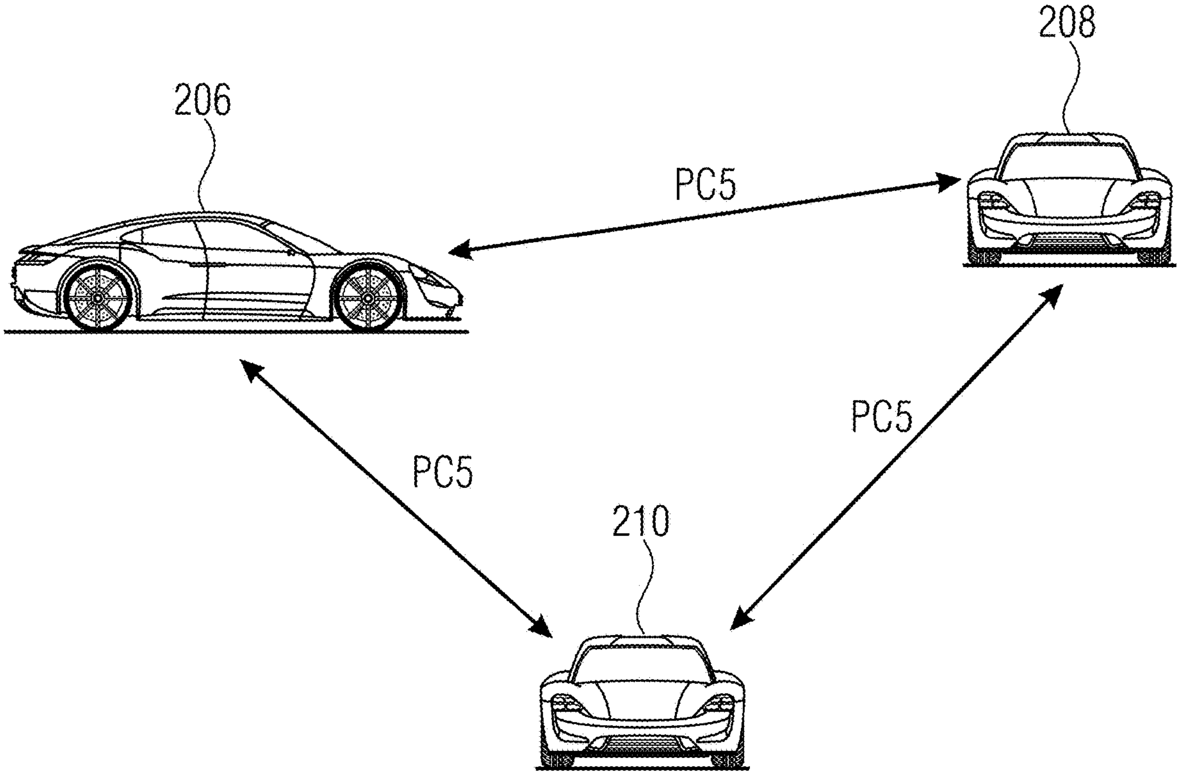
Fig. 3 (PRIOR ART)
FIG. 3 is a schematic representation of an out-of-coverage scenario in which UEs directly communicating with each other receive no SL resource allocation configuration or assistance from a base station.
Figure 4:
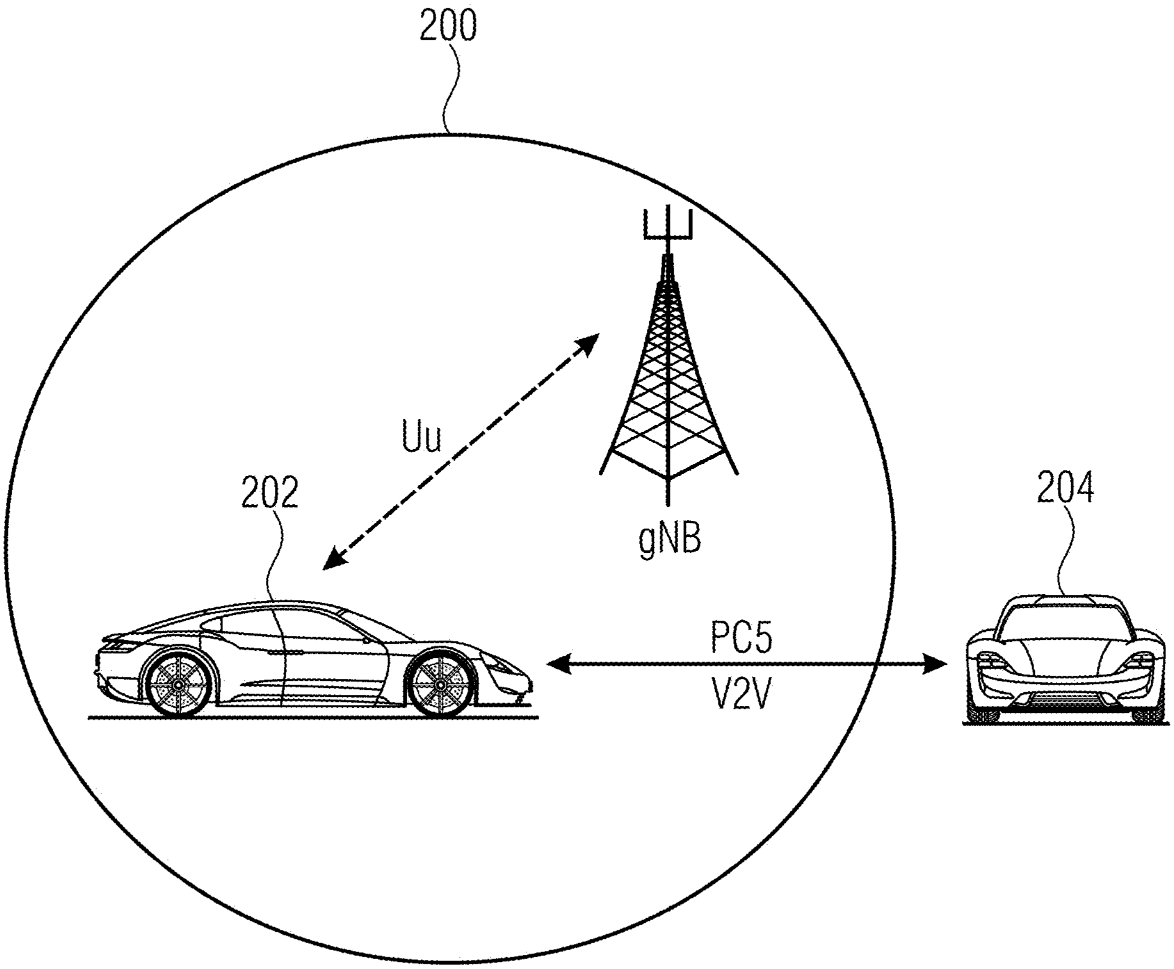
Fig. 4 (PRIOR ART)
FIG. 4 is a schematic representation of a partial out-of-coverage scenario in which some of the UEs directly communicating with each other receive no SL resource allocation configuration or assistance from a base station.
Figure 5:
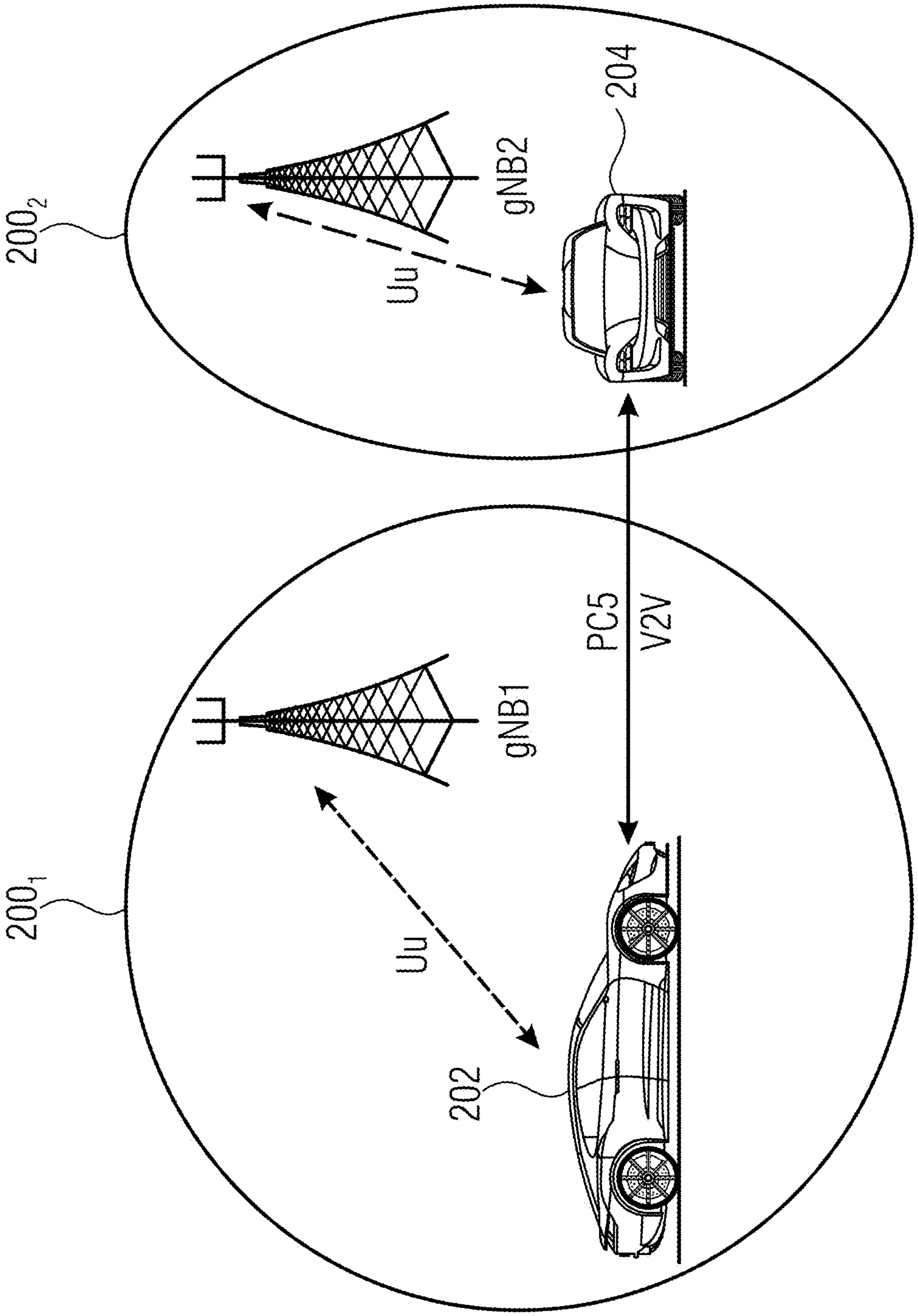
Fig. 5 (PRIOR ART)
FIG. 5 is a schematic representation of an in-coverage scenario in which UEs directly communicating with each other are connected to different base stations.
Figure 6:
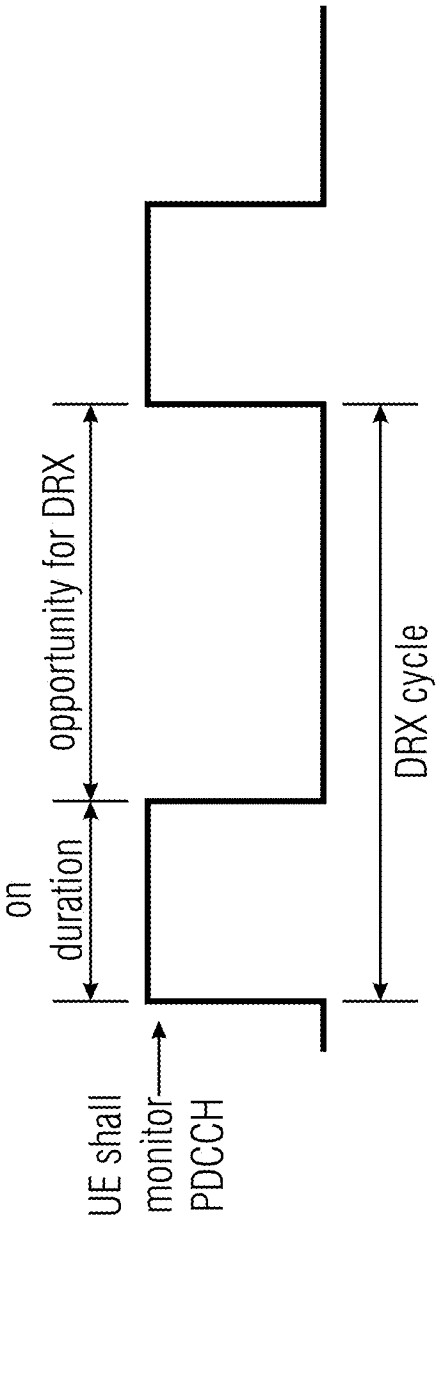
Fig. 6 (PRIOR ART)
FIG. 6 shows in a diagram a schematic illustration of an example of a DRX cycle.
Figure 7:
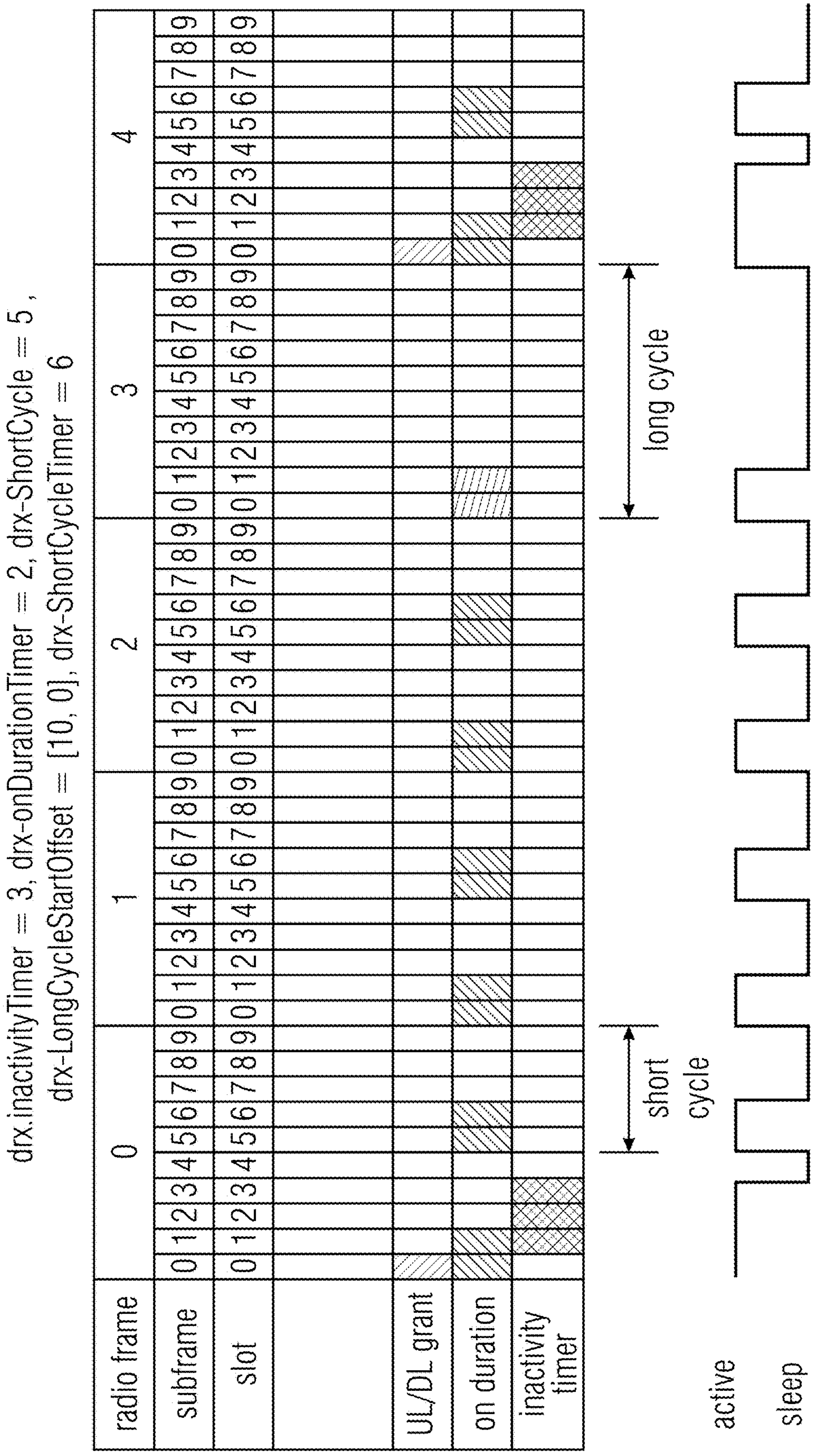
Fig. 7 (PRIOR ART)
FIG. 7 shows in a diagram a schematic illustration of a Rel. 15 (NR) C-DRX example [6]
Figure 8:
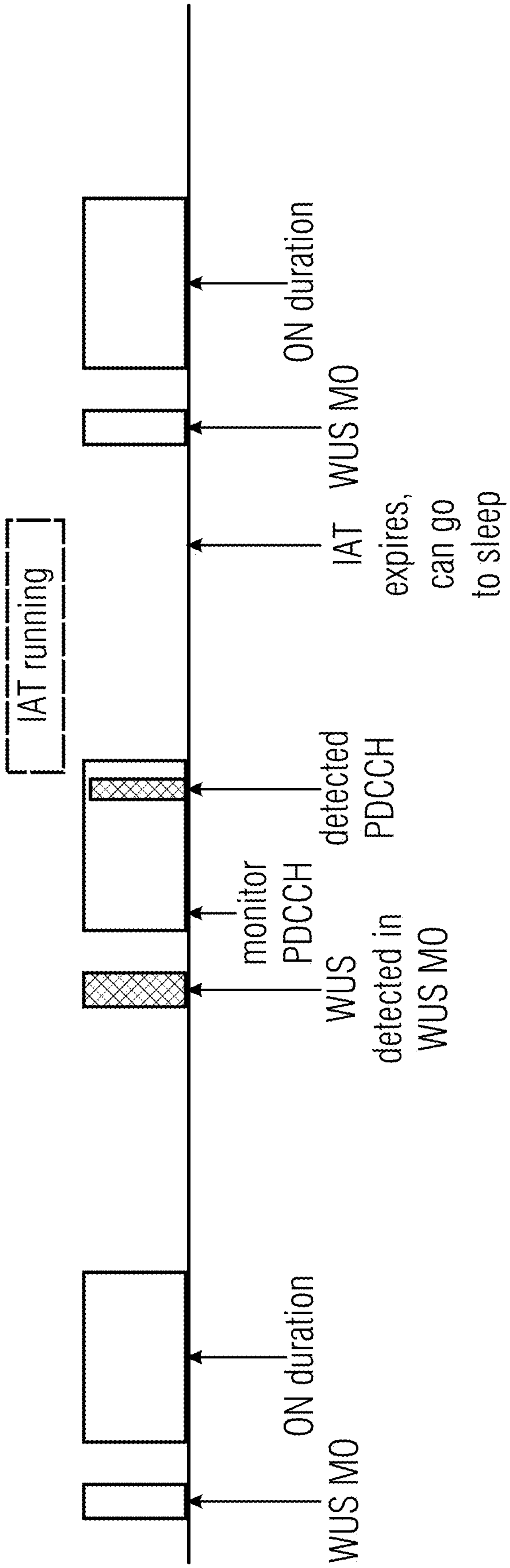
Fig. 8 (PRIOR ART)
FIG. 8 shows a schematic illustration of a Rel 16. WUS (DCI format 2_6) [7]
Figure 9:
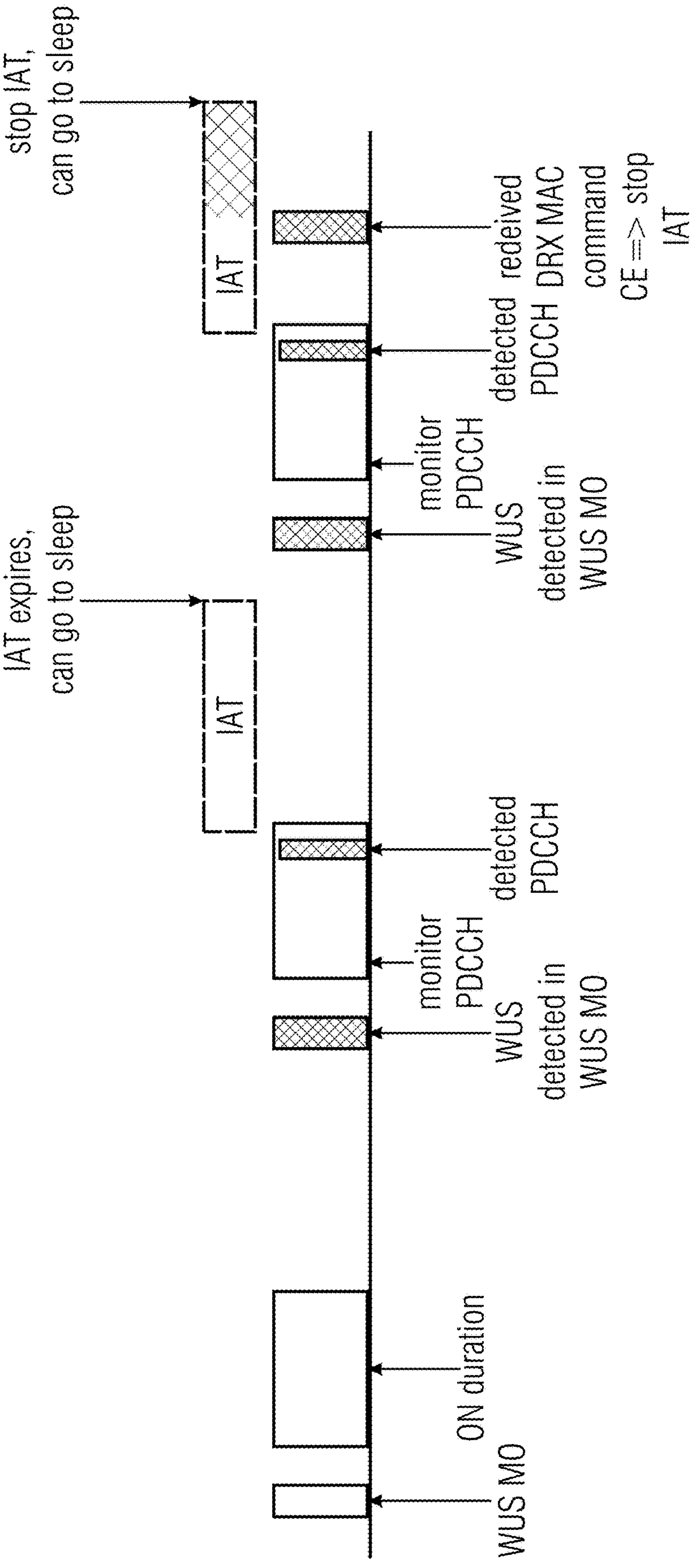
Fig. 9 (PRIOR ART)
FIG. 9 shows a schematic illustration of DRX operation using WUS and using Rel-15 DRX MAC command CE-based GTS [7]

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

DETAILED DESCRIPTION OF THE INVENTION

2. Embodiments of the Present Invention

Embodiments provide solutions for power saving for UEs, e.g., P-UEs, like the vulnerable road users UEs (VRUs), for example, in V2X use cases, and/or for UEs in public safety and commercial use cases where power consumption in the UEs needs to be minimized to save battery.

In accordance with embodiments, this can be achieved by implementation of DRX specifically for V2X application of UEs, e.g., VRUs without or with minimized impact specifically on safety critical applications for UEs.

Thereby, note that 'UEs' herein means UE of any category supporting sidelink features [36.306] i.e. P-UEs and/or V-UEs. This includes the all the possible application areas like commercial, public safety and vehicular communication. For this IPR the UEs that are battery based i.e. have limited power source are the most relevant.

As outlined above in the introductory part, until NR release 16, UE which supports sidelink communication does not follow DRX configuration. This implies that UEs in mode 1 resource allocation which are configured by gNB and in-coverage are assumed to be "always on". Additionally, the aspect of UEs in out-of-coverage where resources are allocated autonomously was not discussed either.

DRX on the sidelink in accordance with embodiments will allow battery-based UEs to save battery to perform sidelink operations in a power efficient manner in in-coverage, out-of-coverage as well as partial coverage scenario. DRX on the NR sidelink is required for advanced V2X use cases including for example, P-UEs, and for UEs in public safety and commercial use cases where power consumption in the UEs needs to be minimized.

In accordance with embodiments, DRX for UEs should minimize the power consumption related e.g. to V2X application on the sidelink considering not only extended off-durations, which should be adapted based on different parameters for e.g. QoS, geographical area, NR numerology and so on. In addition, for the UEs to communicate it is utmost necessary that the on-/off periods of UEs in proximity are aligned. This is true for UEs communicating via Uu interface as well as sidelink. This will result in different advantages for e.g. increase power saving by allowing UE components to go to sleep mode, better overall design of DRX cycles by making e.g. Uu wake up time a multiple of sidelink, or vice versa.

Note: It is optional for UE to support DRX. Hence, there can be DRX enabled UEs as well as non-DRX enabled UEs.

Figure 10:
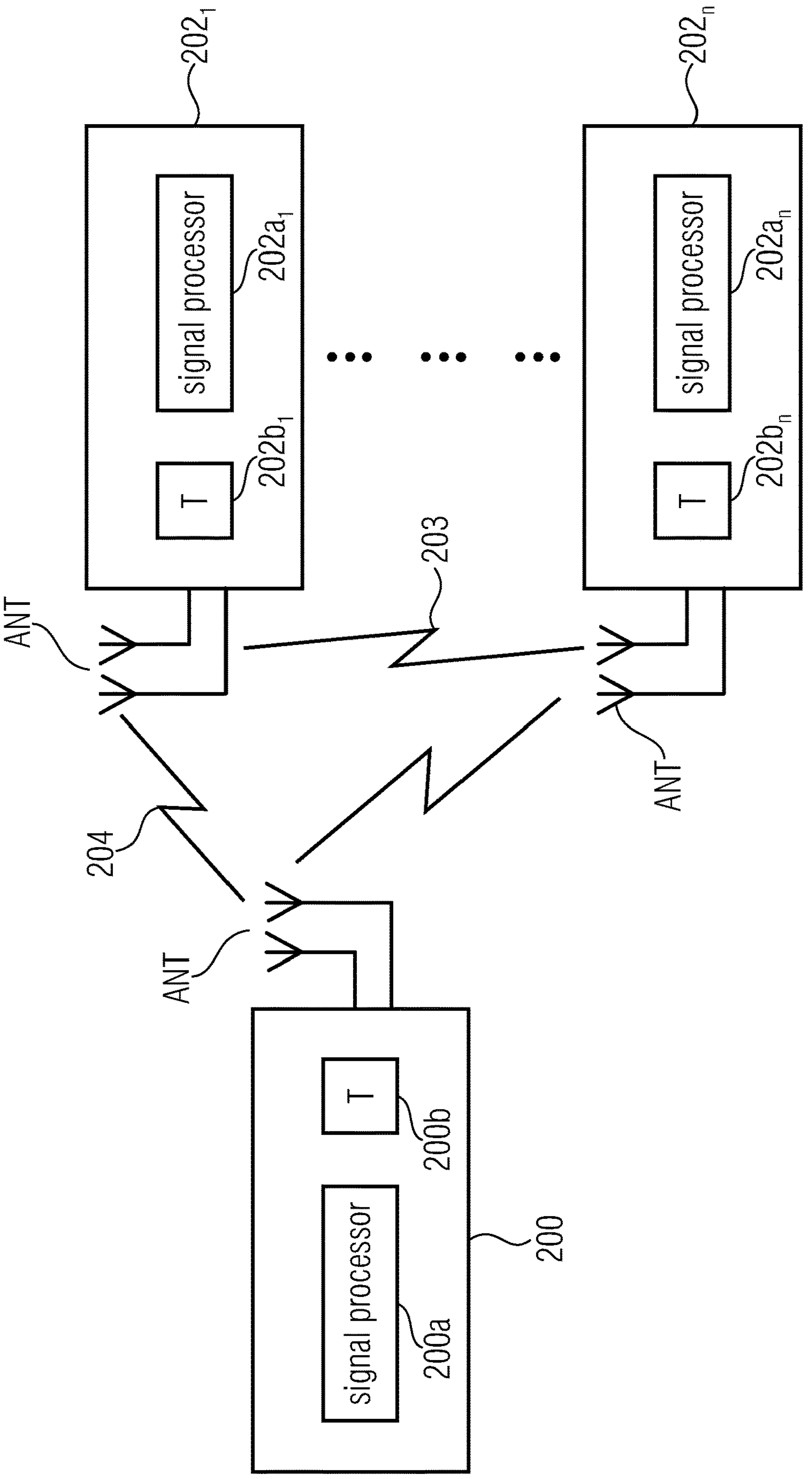
FIG. 10 is a schematic representation of a wireless communication system comprising a transceiver, like a base station or a relay, and a plurality of communication devices, like UEs, according to an embodiment.

Embodiments of the present invention may be implemented in a wireless communication system or network as depicted in FIGS. 1 to 5 including a transceiver, like a base station, gNB, or relay, and a plurality of communication devices, like user equipment's, UEs. FIG. 10 is a schematic representation of a wireless communication system comprising a transceiver 200, like a base station or a relay, and a plurality of communication devices 2021 to 202*n*, like UEs. The UEs might communicated directly with each other via a wireless communication link or channel 203, like a radio link (e.g., using the PC5 interface). Further, the transceiver and the UEs 202 might communicate via a wireless communication link or channel 204, like a radio link (e.g., using the uU interface). The transceiver 200 might include one or more antennas ANT or an antenna array having a plurality of antenna elements, a signal processor 200*a* and a transceiver unit 200*b*. The UEs 202 might include one or more antennas ANT or an antenna array having a plurality of antennas, a signal processor 202*a*1 to 202*an*, and a transceiver unit 202*b*1 to 202*bn*. The base station 200 and/or the one or more UEs 202 may operate in accordance with the inventive teachings described herein.

Embodiments provide a transceiver of a wireless communication system, wherein the transceiver is configured to operate in a [e.g., new radio, NR] sidelink in-coverage, out of coverage or partial coverage scenario [e.g., NR sidelink mode [e.g., mode 1 or mode 2]], in which resources for a sidelink communication [e.g., transmission and/or reception] over a sidelink are pre-configured by the wireless communication system or allocated or scheduled autonomously by the transceiver, wherein the transceiver is configured to receive, in the sidelink in-coverage, out of coverage or partial coverage scenario [e.g., from a base station and/or another transceiver of the wireless communication system], sidelink signals using a discontinuous reception, DRX, mode of operation, wherein at least one parameter of the discontinuous reception, DRX, mode of operation depends on at least one operating parameter of the transceiver [e.g., describing a [e.g., current] operation condition of the transceiver and/or a [e.g., current] operating scenario of the transceiver].

In embodiments, the at least one parameter of the discontinuous reception, DRX, mode of operation is at least one out of

- a cycle of the discontinuous reception, DRX, mode of operation,
- a period [e.g., duration] of on-periods of the discontinuous reception, DRX, mode of operation,
- a period [e.g., duration] of off-periods of the discontinuous reception, DRX, mode of operation,
- a timing [e.g., time instant] of on-periods of the discontinuous reception, DRX, mode of operation,
- a timing [e.g., time instant] of off-periods of the discontinuous reception, DRX, mode of operation,
- an active-time of the discontinuous reception, DRX, mode of operation.

In embodiments, the at least one operating parameter of the transceiver is at least one out of

- a mode of operation of the transceiver [e.g., sidelink mode; mode 1 or mode 2],
- a type of sidelink signals transmitted and/or received by the transceiver [e.g., unicast, groupcast or broadcast signals],
- a speed of the transceiver or a relative speed of the transceiver with respect to another transceiver of the wireless communication system,
- a geographical location of the transceiver,
- a type of the transceiver [e.g., UE profile]
- a battery condition of the transceiver [e.g., type of battery, battery status],
- a configured new radio numerology,
- a type of a received signal [e.g., received message],
- a signal parameter of a received sidelink signal [e.g., a measured constant bit rate, CBR, of a used sidelink resource pool, a measured received signal strength indication, RSSI, a measured reference signal receive power, RSRP],
- a quality of service, QoS, requirement of the transceiver,
- a quality of service, QoS, flow or profile configured for the transceiver,
- a type of V2X message [e.g. CAM, VAM, CPM, DENM],
- traffic type [e.g. periodic, aperiodic],
- a hybrid automatic repeat request, HARQ [e.g., enables retransmission timer],
- a hybrid automatic repeat request, HARQ [e.g., enables inactivity timer],
- existing reservations by the UE [e.g., enables inactivity timer],
- limited spectrum overview [e.g., sensing results.

For example, in case that the sidelink signals are groupcast or broadcast signals, the at least one parameter of the discontinuous reception, DRX, mode of operation can be configured in dependence on the QoS flow or profile. For example, in case that the sidelink signals are unicast signals, the at least one parameter of the discontinuous reception, DRX, mode of operation can be configured in dependence on L2 destination ID.

In embodiments, the transceiver is configured to determine the at least one parameter of the discontinuous reception, DRX, mode of operation itself.

In embodiments, the transceiver is configured to receive a control signal [e.g., via PSCCH and/or PSSCH] from another transceiver [e.g., UE and/or gNB] of the wireless communication system, the control signal comprising an information describing the at least one parameter of the discontinuous reception, DRX, mode of operation, wherein the transceiver is configured to adjust the at least one parameter of the discontinuous reception, DRX, mode of operation based on the information comprised in the control signal.

Embodiments provide a transceiver of a wireless communication system, wherein the transceiver is configured to operate in a [e.g., new radio, NR] sidelink in-coverage, out of coverage or partial coverage scenario [e.g., NR sidelink mode [e.g., mode 1 or mode 2]], in which resources for a sidelink communication [e.g., transmission and/or reception] over a sidelink are pre-configured by the wireless communication system or allocated or scheduled autonomously by the transceiver, wherein the transceiver is configured to receive, in the sidelink in-coverage, out of coverage or partial coverage scenario [e.g., from a base station and/or another transceiver of the wireless communication system], sidelink signals from at least one other transceiver of the wireless communication system using a discontinuous reception, DRX, mode of operation, wherein the transceiver is configured to adjust at least one parameter [e.g., wake-up time and/or on-period] of a sidelink discontinuous reception, DRX, cycle describing periods during which sidelink signals are received in the discontinuous reception, DRX, mode of operation in dependence on at least one other discontinuous reception, DRX, cycle used by the at least one other transceiver.

In embodiments, at least one parameter of the sidelink discontinuous reception, DRX, cycle is at least one out of:

- a period [e.g., duration] of on-periods of the discontinuous reception, DRX, mode of operation,
- a period [e.g., duration] of off-periods of the discontinuous reception, DRX, mode of operation,
- a timing [e.g., time instant] of on-periods of the discontinuous reception, DRX, mode of operation,
- a timing [e.g., time instant] of off-periods of the discontinuous reception, DRX, mode of operation,
- an active-time of the discontinuous reception, DRX, mode of operation.

In embodiments, the transceiver is configured to align the discontinuous reception, DRX, cycle to the at least one other discontinuous reception, DRX, cycle used by the at least one other transceiver.

In embodiments, the transceiver is configured to transmit a sidelink control signal [e.g., via PSCCH and/or PSSCH] to the at least one other transceiver, the sidelink control signal comprising an information [e.g., at least one parameter of the discontinuous reception, DRX, mode of operation] describing the discontinuous reception, DRX, cycle used by the transceiver.

In embodiments, the transceiver is configured to transmit the sidelink control signal in response to a reception of a link establishment request received from the at least one other transceiver.

In embodiments, the transceiver is configured to receive an assistance information from the at least one other transceiver during the link establishment procedure, wherein the assistance information describes a preferred discontinuous reception, DRX, cycle of the at least one other transceiver.

In embodiments, the sidelink control signal comprises a further information describing an operating condition of the transceiver.

In embodiments, the transceiver is configured to transmit a further sidelink control signal comprising a further information describing an operating condition of the transceiver.

For example, the operating condition of the transceiver is one out of

- a battery level of the transceiver,
- a location of the transceiver,
- a channel busy ratio, CBR, information,
- a channel state information, CSI.

In embodiments, the transceiver is configured to transmit a control signal [e.g., via PSCCH and/or PSSCH] to the at least one other transceiver, the sidelink control signal comprising an information [e.g., at least one parameter of the discontinuous reception, DRX, mode of operation] describing the discontinuous reception, DRX, cycle used by the transceiver and the sidelink control signal configured to control the at least one other transceiver to align the at least one other discontinuous reception, DRX, cycle to the discontinuous reception, DRX, used by the transceiver.

In embodiments, the transceiver is configured to operate as a group head of a group of transceivers, the group including the at least one other transceiver.

In embodiments, the transceiver is configured to operate as the group head in response to receiving a control information [e.g., destination layer 2 ID] from higher layers In embodiments, the transceiver is configured to receive a control signal [e.g., via PSCCH and/or PSSCH] from the at least one other transceiver or from a base station of the wireless communication system, the control signal [e.g., RRC, PC5-RRC for layer 2 or 3; or a control information of the sidelink for layer 1] comprising an information [e.g., at least one parameter of the discontinuous reception, DRX, mode of operation; e.g., DRX cycle length and optional a DRX alignment offset] describing the at least one other discontinuous reception, DRX, cycle used by the at least one other transceiver, wherein the transceiver is configured to adjust at least one parameter [e.g., wake-up time and/or on-period] of its discontinuous reception, DRX, cycle in dependence on the information comprised in the control signal.

For example, the transceiver can be configured to align its discontinuous reception, DRX, cycle to the at least one other discontinuous reception, DRX, cycle based on the information comprised in the sidelink control signal.

In embodiments, the transceiver is configured to receive a control signal from at least one other transceiver of the wireless communication system, wherein the control signal comprises a further information describing an operating condition of the other transceiver.

In embodiments, the transceiver is configured to receive a control signal from at least one other transceiver of the wireless communication system, wherein the transceiver is configured to receive a further control signal from the other transceiver, the further control signal comprising a further information describing an operating condition of the transceiver.

For example, the operating condition of the transceiver is one out of a battery level of the transceiver, a location of the transceiver, a channel busy ratio, CBR, information, a channel state information, CSI.

In embodiments, the transceiver is configured to receive sidelink control signals [e.g., via PSCCH and/or PSSCH] from at least two other transceivers [e.g., broadcast case/groupcast case] of the wireless communication system, each sidelink control signal comprising an information [e.g., at least one parameter of the discontinuous reception, DRX, mode of operation; e.g., DRX cycle length and optional a DRX alignment offset] describing a respective discontinuous reception, DRX, cycle used by a respective transceiver of the at least two other transceivers, wherein the transceiver is configured to adjust at least one parameter [e.g., wake-up time and/or on-period] of its discontinuous reception, DRX, cycle in dependence on the respective information comprised in the respective sidelink control signal.

For example, the transceiver can be configured to align its discontinuous reception, DRX, cycle to at least one of the at least two other discontinuous reception, DRX, cycles based on the respective information comprised in the respective sidelink control signal.

In embodiments, the transceiver is configured to receive a sidelink control signal [e.g., via PSCCH and/or PSSCH] from exactly one other transceiver [e.g., unicast case] of the wireless communication system, the sidelink control signal comprising an information [e.g., at least one parameter of the discontinuous reception, DRX, mode of operation] describing a discontinuous reception, DRX, cycle used by the other transceiver, wherein the transceiver is configured to adjust at least one parameter [e.g., wake-up time and/or on-period] of its discontinuous reception, DRX, cycle in dependence on the information comprised in the sidelink control signal.

For example, the transceiver can be configured to align its discontinuous reception, DRX, cycle to the other discontinuous reception, DRX, cycle based on the information comprised in the sidelink control signal.

In embodiments, the transceiver is configured to receive a control signal from at least one other transceiver of the wireless communication system, wherein the control signal comprises a further information describing an operating condition of the other transceiver.

In embodiments, the transceiver is configured to receive a control signal from at least one other transceiver of the wireless communication system, wherein the transceiver is configured to receive a further control signal from the other transceiver, the further control signal comprising a further information describing an operating condition of the transceiver.

For example, the operating condition of the transceiver is one out of a battery level of the transceiver, a location of the transceiver, a channel busy ratio, CBR, information, a channel state information, CSI.

In embodiments, the transceiver is configured to align the discontinuous reception, DRX, cycle in dependence on a [e.g., periodically or event driven] received control signal [e.g., comprising sidelink control information [e.g., first stage sidelink control information, SCI]] [e.g., received from the at least one other transceiver or a base station of the wireless communication system].

In embodiments, the transceiver is configured to align a wake-up time of the discontinuous reception, DRX, cycle with the [e.g., periodically or event driven] received control signal [e.g., comprising sidelink control information [e.g., first stage sidelink control information, SCI]].

In embodiments, the transceiver is configured to receive a control signal [e.g., PC5-RRC or RRC] from the at least one other transceiver or a base station of the wireless communication system, the control signal comprising a control information [e.g., DRX cycle length or a common DRX configuration] describing a discontinuous reception, DRX, cycle to be used by the transceiver, wherein the transceiver is configured to set at least one parameter of its discontinuous reception, DRX, cycle in dependence on the control information.

In embodiments, the transceiver is configured to adjust at least one parameter [e.g., DRX period] of its discontinuous reception, DRX, cycle in dependence on a geographical location of the transceiver [e.g., position of the transceiver; or geographical zone or area the transceiver is located].

In embodiments, the transceiver is configured to select the at least one parameter out of a set of different parameters in dependence on the geographical location of the transceiver, each parameter of the set of different parameters being association with a different geographical location [e.g., different geographical zone or area].

In embodiments, the transceiver is configured to select at least two parameters out of the set of different parameters in dependence on the on the geographical location of the transceiver, a first parameter of the at least two parameters corresponding to the geographical location of the transceiver and at least a second parameter of the at least two parameters corresponding to a neighboring location neighboring the location of the transceiver.

In embodiments, the transceiver is configured to adjust at least one parameter of its discontinuous reception, DRX, cycle in dependence on a received synchronization signal [e.g., synchronization signal block, SSB].

For example, the transceiver can be configured to align the discontinuous reception, DRX, cycle in dependence on a received synchronization signal [e.g., synchronization signal block, SSB].

In embodiments, the transceiver is configured to configure [e.g., or adjust] at least one parameter of the discontinuous reception, DRX, cycle in dependence on a synchronization source of the transceiver.

In embodiments, the transceiver is configured to configure [or adjust] at least one parameter of the discontinuous reception, DRX, cycle in dependence on a control information [e.g., DRX configuration] received from a base station of the wireless communication system [e.g., via a control signal].

In embodiments, the transceiver is configured to configure [or adjust] at least one parameter of the discontinuous reception, DRX, cycle in dependence on a sidelink control information [e.g., DRX configuration] received from another transceiver of the wireless communication system [e.g., via a sidelink control signal [e.g., PC5 interface].

In embodiments, the transceiver is configured to configure at least one parameter of the discontinuous reception, DRX, cycle in dependence on a control information [e.g., DRX configuration] received from a road side unit of the wireless communication system.

In embodiments, the transceiver is configured to transmit a reporting signal, the reporting signal comprising an information describing a preferred discontinuous reception, DRX, cycle of the transceiver.

For example, the transceiver can be configured to report its preferred DRX configuration as per e.g. the delay budget report via UE assistance information.

Further embodiments provide a transceiver of a wireless communication system, wherein the transceiver is configured to operate in a [e.g., new radio, NR] sidelink in-coverage, out of coverage [e.g. in case of exceptional cases such as RLF] or partial coverage scenario [e.g., NR sidelink mode [e.g., mode 1 or mode 2]], in which resources for a sidelink communication [e.g., transmission and/or reception] over a sidelink are pre-configured by the wireless communication system or allocated or scheduled autonomously by the transceiver, wherein the transceiver is configured to receive, in the sidelink in-coverage, out of coverage [e.g. in case of exceptional cases such as RLF] or partial coverage scenario [e.g., from a base station and/or another transceiver of the wireless communication system], sidelink signals from at least one other transceiver of the wireless communication system using a sidelink discontinuous reception, DRX, mode of operation, wherein the transceiver is [e.g., directionally or bi-directionally] configured to adjust at least one parameter [e.g., wake-up time and/or on-period] of a sidelink discontinuous reception, DRX, cycle describing periods during which sidelink signals are received in the discontinuous reception, DRX, mode of operation in dependence on a downlink discontinuous reception, DRX, cycle used by the transceiver for receiving signals from a base station of the wireless communication system.

In embodiments, the transceiver is configured to adjust the at least one parameter [e.g., wake-up time and/or on-period] of the sidelink discontinuous reception, DRX, cycle, in order to align or synchronize the sidelink discontinuous reception, DRX, cycle and the downlink discontinuous reception, DRX, cycle.

In embodiments, the at least one parameter of the sidelink discontinuous reception, DRX, cycle is at least one out of a wake-up time, and an on-period.

In embodiments, the transceiver is configured to [e.g., fully] align or synchronize the at least one parameter [e.g., wake-up time and/or on-period] of the sidelink discontinuous reception, DRX, cycle with the same at least one parameter [e.g., wake-up time and/or on-period] of the downlink discontinuous reception, DRX, cycle.

For example, the transceiver can be configured to align or synchronize the wake-up time of the sidelink discontinuous reception, DRX, cycle with the wake-up time of the downlink discontinuous reception, DRX, cycle.

For example, the transceiver can be configured to align or synchronize the on-period of the sidelink discontinuous reception, DRX, cycle with the on-period of the downlink discontinuous reception, DRX, cycle.

In embodiments, the transceiver is configured to partially [e.g., fractionally] align or synchronize the at least one parameter [e.g., wake-up time and/or on-period] of the sidelink discontinuous reception, DRX, cycle with the same at least one parameter [e.g., wake-up time and/or on-period] of the downlink discontinuous reception, DRX, cycle.

For example, the transceiver can be configured to partially align or synchronize the wake-up time of the sidelink discontinuous reception, DRX, cycle with the wake-up time of the downlink discontinuous reception, DRX, cycle.

For example, the transceiver can be configured to partially align or synchronize the on-period of the sidelink discontinuous reception, DRX, cycle with the on-period of the downlink discontinuous reception, DRX, cycle, such that the on-periods of the of the sidelink discontinuous reception, DRX, cycle and the downlink discontinuous reception, DRX, cycle at least partially overlap.

In embodiments, the transceiver is configured to [e.g., fully or partially] adjust the at least one parameter [e.g., wake-up time and/or on-period] of consecutive sidelink discontinuous reception, DRX, cycles in dependence on at least two other sidelink discontinuous reception, DRX, cycles used by at least two other transceivers of the wireless communication system.

For example, the transceiver can be configured to adjust [e.g., align or synchronize] a wake-up time of a first sidelink discontinuous reception, DRX, cycle to a first other sidelink discontinuous reception, DRX, cycle used by a first other transceiver, wherein the transceiver can be configured to adjust [e.g., align or synchronize] a wake-up time of a second sidelink discontinuous reception, DRX, cycle to a second other sidelink discontinuous reception, DRX, cycle used by a second other transceiver.

In embodiments, the transceiver is further configured to align or synchronize at least one parameter of the downlink discontinuous reception, DRX, cycle in dependence on one or two other sidelink discontinuous reception, DRX, cycles used by other transceivers of the wireless communication system.

In embodiments, the wireless communication system is a first wireless communication system [e.g., NR], wherein the sidelink communication is a first sidelink communication, wherein the discontinuous reception, DRX, cycle is a first discontinuous reception, DRX, cycle, wherein the transceiver is configured to communicate with a second wireless communication system [e.g., LTE], wherein the transceiver is configured to operate in the second wireless communication system in a sidelink in-coverage, out of coverage [e.g. in case of exceptional cases such as RLF] or partial coverage scenario, in which resources for a second sidelink communication [e.g., transmission and/or reception] over a second sidelink are pre-configured by the second wireless communication system or allocated or scheduled autonomously by the transceiver, wherein the transceiver is configured to receive, in the second sidelink in-coverage, out of coverage [e.g. in case of exceptional cases such as RLF] or partial coverage scenario [e.g., from a base station and/or another transceiver of the second wireless communication system], sidelink signals from at least one other transceiver of the second wireless communication system using a second sidelink discontinuous reception, DRX, mode of operation, wherein the transceiver is further configured to align or synchronize the at least one parameter [e.g., wake-up time and/or on-period] of the first sidelink discontinuous reception, DRX, cycle with at least one parameter [e.g., wake-up time and/or on-period] of the second sidelink discontinuous reception, DRX, cycle.

In embodiments, the transceiver is configured to transmit a reporting signal to a base station of the wireless communication system, the reporting signal comprising an information describing a sidelink communication characteristics [e.g., schedule, traffic pattern information list, traffic destination, traffic type, traffic periodicity] of the sidelink communication between the transceiver and the at least one other transceiver of the wireless communication system.

In embodiments, the transceiver is configured to receive a control signal from the base station, the control signal comprising an information [e.g., at least one parameter] describing the downlink discontinuous reception, DRX, cycle to be used by the transceiver, wherein the transceiver is configured to adjust at least one parameter of the downlink discontinuous reception, DRX, cycle in dependence on the information comprised in the control signal.

In embodiments, the transceiver is configured to adjust the at least one parameter of the sidelink discontinuous reception, DRX, cycle in dependence on a sidelink traffic [e.g., traffic type periodic or aperiodic].

In embodiments, the transceiver is configured to adjust the at least one parameter of the sidelink discontinuous reception, DRX, cycle by selecting, in dependence on the sidelink traffic or transmission cast type, a cycle length out of a set of different cycle lengths [e.g. short or long DRX cycle lengths] [e.g., associated with different traffic types or cast types].

In embodiments, the transceiver is configured to adjust the at least one parameter [e.g., cycle length, such as short or long DRX cycle] of the sidelink discontinuous reception, DRX, cycle further in dependence at least one parameter [e.g., cycle length, such as short or long DRX cycle] of the downlink discontinuous reception, DRX, cycle.

In embodiments, the transceiver is configured to, in a RRC idle or RRC inactive state, adjust the at least one parameter [e.g., cycle length, such as short or long DRX cycle] of the sidelink discontinuous reception, DRX, cycle further in dependence on the downlink discontinuous reception, DRX, cycle that is used for a paging occasion.

In embodiments, the transceiver is configured to operate in the sidelink out of coverage scenario, wherein the transceiver is configured to receive a sidelink control signal from another transceiver [e.g., UE or relay] of the wireless communication system [e.g., the other transceiver operating in the in-coverage or partial coverage scenario], wherein the sidelink control signal comprises an information [e.g., at least one parameter] describing

- the downlink discontinuous reception, DRX, cycle to be used by the transceiver, and/or
- the sidelink discontinuous reception, DRX, cycle to be used by the transceiver.

In embodiments, the transceiver is configured to operate in the sidelink in-coverage or partial coverage scenario, wherein the transceiver is configured to forward a control signal to another transceiver of the wireless communication system [e.g., the other transceiver operating in out of coverage scenario], the control signal comprising an information [e.g., at least one parameter] describing

- the downlink discontinuous reception, DRX, cycle to be used by the other transceiver, and/or
- the sidelink discontinuous reception, DRX, cycle to be used by the other transceiver.

In embodiments, the transceiver is configured, in case of changing to the out of coverage scenario, maintain operating based on the previous sidelink discontinuous reception, DRX, cycle until a termination criterion [e.g., a timer expires or RLF is declared] is reached.

In embodiments, the at least one parameter of the discontinuous reception, DRX, cycle is at least one out of

- a period [e.g., duration] of on-periods of the discontinuous reception, DRX, mode of operation,
- a period [e.g., duration] of off-periods of the discontinuous reception, DRX, mode of operation,
- a timing [e.g., time instant] of on-periods of the discontinuous reception, DRX, mode of operation,
- a timing [e.g., time instant] of off-periods of the discontinuous reception, DRX, mode of operation,
- an active-time of the discontinuous reception, DRX, mode of operation.

In embodiments, the discontinuous reception, DRX, cycle describes a periodic repetition of on-periods followed by off-periods of a reception in the sidelink.

Further embodiment provide a transceiver [e.g., first transceiver, e.g., UE1] of a wireless communication system, wherein the transceiver is configured to operate in a [e.g., new radio, NR] sidelink in-coverage, out of coverage or partial coverage scenario [e.g., NR sidelink mode [e.g., mode 1 or mode 2]], in which resources for a sidelink communication [e.g., transmission and/or reception] over a sidelink are pre-configured by the wireless communication system or allocated or scheduled autonomously by the transceiver, wherein the transceiver is configured to operate [e.g., in the sidelink in-coverage, out of coverage or partial coverage scenario] in a sidelink discontinuous reception, DRX, mode of operation, wherein the transceiver is configured to transmit to at least one candidate relaying transceiver [e.g., V-UE] of the wireless communication system a sidelink relaying request and a discontinuous reception, DRX, signaling information, the sidelink relaying request requesting the candidate relaying transceiver to re-transmit sidelink signals of another transceiver [e.g., second transceiver] of the wireless communication system during discontinuous reception, DRX, periods of a discontinuous reception, DRX, mode of operation of the transceiver [e.g., in which the transceiver operates], the discontinuous reception, DRX, signaling information indicating the discontinuous reception, DRX, periods, wherein the transceiver is configured to receive, in the sidelink in-coverage, out of coverage or partial coverage scenario, sidelink signals of the other transceiver that are re-transmitted by a relaying transceiver during the discontinuous reception, DRX, periods of the discontinuous reception, DRX, mode of operation of the transceiver, the relaying transceiver being one of the at least candidate relaying transceiver that accepted the sidelink relaying request.

In embodiments, the transceiver is configured to receive a relaying request acknowledgement from the relaying transceiver [e.g., during a discontinuous reception, DRX, period of the discontinuous reception, DRX, mode of operation of the transceiver].

In embodiments, the transceiver is configured to receive from the relaying transceiver a discontinuous reception, DRX, period extension indication indicating to extend a discontinuous reception, DRX, period for receiving a sidelink signal whose transmission requires more time than a regular discontinuous reception, DRX, period, wherein the transceiver is configured to extend the discontinuous reception, DRX, period for receiving said sidelink signal based on the discontinuous reception, DRX, period extension indication.

In embodiments, transceiver is configured to receive another sidelink signal from the relaying transceiver during a discontinuous reception, DRX, period of the discontinuous reception, DRX, mode of operation of the transceiver.

In embodiments, the transceiver is configured to transmit the sidelink relaying request in dependence on at least one out of

- a power of received sidelink signals,
- a battery level of the transceiver,
- a mobility condition of the transceiver,
- a zone the transceiver is located,
- a geographical position the transceiver is located.

In embodiments, at least one out of

- a start of a cycle of the discontinuous reception, DRX, mode of operation, a start of on-periods of the discontinuous reception, DRX, mode of operation, a start of off-periods of the discontinuous reception, DRX, mode of operation, a timing [e.g., time instant] of on-periods of the discontinuous reception, DRX, mode of operation, a timing [e.g., time instant] of off-periods of the discontinuous reception, DRX, mode of operation, a start of an active-time of the discontinuous reception, DRX, mode of operation, is defined by at least one out of a packet arrival, traffic triggered, transceiver triggered, base station triggered.

In embodiments, at least one out of a cycle of the discontinuous reception, DRX, mode of operation, a period [e.g., duration] of on-periods of the discontinuous reception, DRX, mode of operation, a period [e.g., duration] of off-periods of the discontinuous reception, DRX, mode of operation, a timing [e.g., time instant] of on-periods of the discontinuous reception, DRX, mode of operation, a timing [e.g., time instant] of off-periods of the discontinuous reception, DRX, mode of operation, an active-time of the discontinuous reception, DRX, mode of operation.

is stopped in response to one of the following events:

an exceptional condition [e.g., RLF], no response [e.g., acknowledgement] from the other transceiver beyond a certain validity time or defined period, lack of alignment information from the other transceiver, lack of assistance information from the other transceiver or base station, a lower battery level, a completion of an ongoing service, a pre-emption due to higher QoS [e.g. priority, service], failure in the negotiation procedure from the transceiver and/or other transceiver.

In embodiments, the transceiver is configured to receive sidelink signals using the FR1-frequency band, and/or wherein the transceiver is configured to receive sidelink signals using the FR2-frequency band.

In embodiments, the transceiver is configured to align a first discontinuous reception, DRX, cycle used for receiving sidelink signals via the FR1-frequency band and a second discontinuous reception, DRX, cycle used for receiving sidelink signals via the FR2-frequency band.

In embodiments, the transceiver is battery-operated.

In embodiments, the transceiver is a user equipment.

Embodiments provide a base station of a wireless communication system, wherein the base station is configured to receive a reporting signal from a transceiver of the wireless communication system the reporting signal comprising an information describing a sidelink communication pattern [e.g., sidelink communication schedule] of a sidelink communication between the transceiver and at least one other transceiver of the wireless communication system, wherein the base station is configured to determine at least one parameter of a sidelink discontinuous reception, DRX, cycle of a sidelink discontinuous reception, DRX, mode to be used by the transceiver for receiving sidelink signals from the at least one other transceiver in dependence on the information describing the sidelink communication characteristics, wherein the base station is configured to determine at least one parameter of a downlink discontinuous reception, DRX, cycle of a downlink discontinuous reception, DRX, mode to be used by the transceiver for receiving downlink signals from the base station in dependence on the information describing the sidelink communication characteristics, wherein the base station is configured to transmit a control signal to the transceiver, the control signal comprising an information describing the determined at least one parameter of the sidelink discontinuous reception, DRX, cycle and the determined at least one parameter of the downlink discontinuous reception, DRX, cycle.

In embodiments, the base station is configured to determine the at least one parameter of the sidelink discontinuous reception, DRX, cycle and the at least one parameter of the downlink discontinuous reception, DRX, cycle such that the sidelink discontinuous reception, DRX, cycle and the downlink discontinuous reception, DRX, cycle are aligned or synchronized.

Further embodiments provide a relaying transceiver [e.g., V-UE] of a wireless communication system, wherein the relaying transceiver is configured to receive from a transceiver [e.g., first transceiver] of the wireless communication system a sidelink relaying request and a discontinuous reception, DRX, signaling information, the sidelink relaying request requesting the relaying transceiver to re-transmit sidelink signals of another transceiver [e.g., second transceiver] of the wireless communication system during discontinuous reception, DRX, periods of a discontinuous reception, DRX, mode of operation of the transceiver [e.g., in which the transceiver operates], the discontinuous reception, DRX, signaling information indicating the discontinuous reception, DRX, periods, wherein the relaying transceiver is configured to re-transmit the sidelink signals received from the other transceiver, wherein the transceiver is configured to re-transmit said sidelink signals during the discontinuous reception, DRX, periods of the discontinuous reception, DRX, mode of operation of the transceiver.

In embodiments, the relaying transceiver is configured to operate in a [e.g., new radio, NR] sidelink in-coverage, out of coverage or partial coverage scenario [e.g., NR sidelink mode [e.g., mode 1 or mode 2]], in which resources for a sidelink communication [e.g., transmission and/or reception] over a sidelink are pre-configured by the wireless communication system or allocated or scheduled autonomously by the transceiver, In embodiments, the relaying transceiver is configured to switch into a relaying mode of operation responsive to the reception of the sidelink relaying request from the transceiver and to transmit a relaying request acknowledgement to the transceiver [e.g., during the discontinuous reception, DRX, periods of the discontinuous reception, DRX, mode of operation of the transceiver].

In embodiments, the relaying transceiver is configured to buffer sidelink signals received from the other transceiver and to re-transmit said sidelink signals to the transceiver during discontinuous reception, DRX, periods of a discontinuous reception, DRX, mode of operation of the transceiver.

In embodiments, in case that re-transmitting a sidelink signal received from the other transceiver requires more time than a discontinuous reception, DRX, period of a discontinuous reception, DRX, mode of operation of the transceiver, the relaying transceiver is configured to transmit to the transceiver a discontinuous reception, DRX, period extension indication indicating to extend a discontinuous reception, DRX, period.

Further embodiments provide a wireless communication system, wherein the wireless communication system comprises a transceiver according to one of the herein described embodiments and a base station according to one of the herein described embodiments.

Further embodiments provide a method for operating a transceiver of a wireless communication system, the method comprising: operating the transceiver in a [e.g., new radio, NR] sidelink in-coverage, out of coverage or partial coverage scenario [e.g., NR sidelink mode [e.g., mode 1 or mode 2]], in which resources for a sidelink communication [e.g., transmission and/or reception] over a sidelink are preconfigured by the wireless communication system or allocated or scheduled autonomously by the transceiver; receiving, in the sidelink in-coverage, out of coverage or partial coverage scenario [e.g., from a base station and/or another transceiver of the wireless communication system], sidelink signals using a discontinuous reception, DRX, mode of operation; wherein at least one parameter of the discontinuous reception, DRX, mode of operation depends on at least one operating parameter of the transceiver [e.g., describing a [e.g., current] operation condition.

Further embodiments provide a method for operating a transceiver of a wireless communication system, the method comprising: operating the transceiver in a [e.g., new radio, NR] sidelink in-coverage, out of coverage or partial coverage scenario [e.g., NR sidelink mode [e.g., mode 1 or mode 2]], in which resources for a sidelink communication [e.g., transmission and/or reception] over a sidelink are preconfigured by the wireless communication system or allocated or scheduled autonomously by the transceiver; receiving, in the sidelink in-coverage, out of coverage or partial coverage scenario [e.g., from a base station and/or another transceiver of the wireless communication system], sidelink signals from at least one other transceiver of the wireless communication system using a discontinuous reception, DRX, mode of operation; adjusting at least one parameter [e.g., wake-up time and/or on-period] of a sidelink discontinuous reception, DRX, cycle describing periods during which sidelink signals are received in the discontinuous reception, DRX, mode of operation in dependence on at least one other discontinuous reception, DRX, cycle used by the at least one other transceiver.

Further embodiments provide a method for operating a transceiver of a wireless communication system, the method comprising: operating the transceiver in a [e.g., new radio, NR] sidelink in-coverage, out of coverage or partial coverage scenario [e.g., NR sidelink mode [e.g., mode 1 or mode 2]], in which resources for a sidelink communication [e.g., transmission and/or reception] over a sidelink are preconfigured by the wireless communication system or allocated or scheduled autonomously by the transceiver; receiving, in the sidelink in-coverage, out of coverage [e.g. in case of exceptional cases such as RLF] or partial coverage scenario [e.g., from a base station and/or another transceiver of the wireless communication system], sidelink signals from at least one other transceiver of the wireless communication system using a sidelink discontinuous reception, DRX, mode of operation; adjusting at least one parameter [e.g., wake-up time and/or on-period] of a sidelink discontinuous reception, DRX, cycle describing periods during which sidelink signals are received in the discontinuous reception, DRX, mode of operation in dependence on a downlink discontinuous reception, DRX, cycle used by the transceiver for receiving signals from a base station of the wireless communication system.

Further embodiments provide a method for operating a base station of a wireless communication network, the method comprising: receiving a reporting signal from a transceiver of the wireless communication system the reporting signal comprising an information describing a sidelink communication pattern [e.g., sidelink communication schedule] of a sidelink communication between the transceiver and at least one other transceiver of the wireless communication system; determining at least one parameter of a sidelink discontinuous reception, DRX, cycle of a sidelink discontinuous reception, DRX, mode to be used by the transceiver for receiving sidelink signals from the at least one other transceiver in dependence on the information describing the sidelink communication pattern; determining at least one parameter of a downlink discontinuous reception, DRX, cycle of a downlink discontinuous reception, DRX, mode to be used by the transceiver for receiving downlink signals from the base station in dependence on the information describing the sidelink communication pattern; transmitting a control signal to the transceiver, the control signal comprising an information describing the determined at least one parameter of the sidelink discontinuous reception, DRX, cycle and the determined at least one parameter of the downlink discontinuous reception, DRX, cycle.

In embodiments, DRX for the NR sidelink for broadcast, groupcast, and unicast is adapted to minimize the UE power consumption depending on the UE condition and scenarios. It includes the following aspects:

- Adapt on- and off-durations in sidelink optimized for power saving and specify the corresponding UE procedure In this embodiment, adaptation of the DRX cycle length i.e. on and off durations with the corresponding UE procedure has been discussed in 2.1.1 The adapted DRX cycle followed by the UE depends on various parameters for e.g. different modes of operation i.e. Mode 1 and Mode 2, communication types i.e. broadcast, groupcast or unicast, the geolocation of the UEs, UE behavior as well as environmental and geographical conditions. The respective timers and signaling information elements are defined in section 2.2.2.

- Mechanism aiming to align/synchronize sidelink DRX wake-up time among the UEs communicating with each other This embodiment focusses on specifying a mechanism in order to align the DRX cycles amongst the UEs communicating via SL communication via Layer 1, 2 as well as 3. In order to make sure that the UEs do not miss any information from the UEs in proximity while saving energy, the different DRX cycles have to be aligned.

- Mechanism aiming to align sidelink DRX wake-up time with Uu DRX wake-up time in an in-coverage UE
  - Align SL DRX periods with Uu DRX for in coverage UEs, e.g. restrict SL on-time to DL on-time periods as a UE may save more battery, while being off in DL & SL simultaneously.
    - Different UE coverage modes will be considered, e.g. Out-of-coverage with no synchronization with DL, partial coverage, short out-of-coverage as exceptional case
  - Synchronization source for both, SL and DL In addition to the details in the WID, related solutions for DRX power saving include.

- FR2 specific impact of DRX
- For sidelink in FR2 a DRX configuration is broadly discussed.

Subsequently, embodiments of the present invention are described in further detail.

2.1 Adapt On- and Off Durations in Sidelink Optimized for Power Saving

In this embodiment, adaptation of the DRX cycle length i.e. on and off durations with the corresponding UE procedure has been discussed. The motivation is to enable power saving amongst UEs because of which the power constrained UEs e.g. P-UEs can perform operations efficiently. The adapted DRX cycle followed by the UE depends on various parameters for e.g. different modes of operation i.e. Mode 1 and Mode 2, communication types i.e. broadcast, groupcast or unicast, the geolocation of the UEs, UE behavior as well as environmental and geographical conditions.

In embodiments, the following parameters defined for Uu as mentioned in section 1.3.1 can include even SL related aspects for DRX configuration:

- on-duration: should include the duration where the UE is waiting to receive the PSCCH or PSSCH. If the UE successfully decodes the PSCCH or PSSCH, the UE stays awake and starts the inactivity timer;
- inactivity-timer: including the time UE waits to successfully decode a PSCCH. If it fails to do the last successful decoding of PSCCH or PSSCH, it goes back to sleep. The UE shall restart the inactivity timer following a single successful decoding of a PSCCH or PSSCH for a first transmission only (i.e. not for retransmissions);
- retransmissiontimerSL: duration until a SL retransmission can be expected;
- cycle: specifies the periodic repetition of the on-duration followed by a possible period of inactivity of SL;
- active-time: total duration that the UE monitors the PSCCH or PSSCH. This includes the "on-duration" of the DRX cycle, the time UE is performing continuous reception while the inactivity timer has not expired, and the time when the UE is performing continuous reception while waiting for a retransmission opportunity.

Figure 11A:
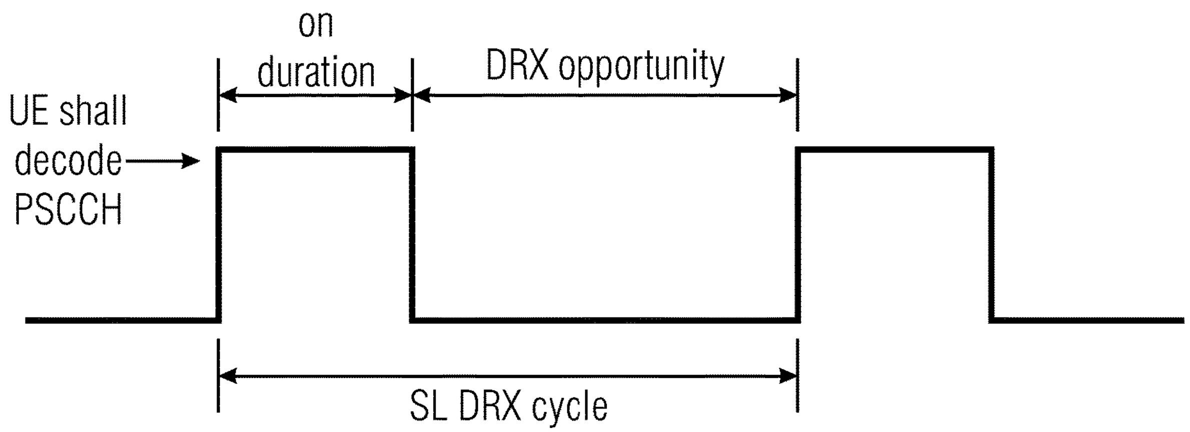
FIG. 11*a* shows in a diagram schematic illustrations of a mode 2 DRX cycle for SL, e.g., for V-UE.
Figure 11B:
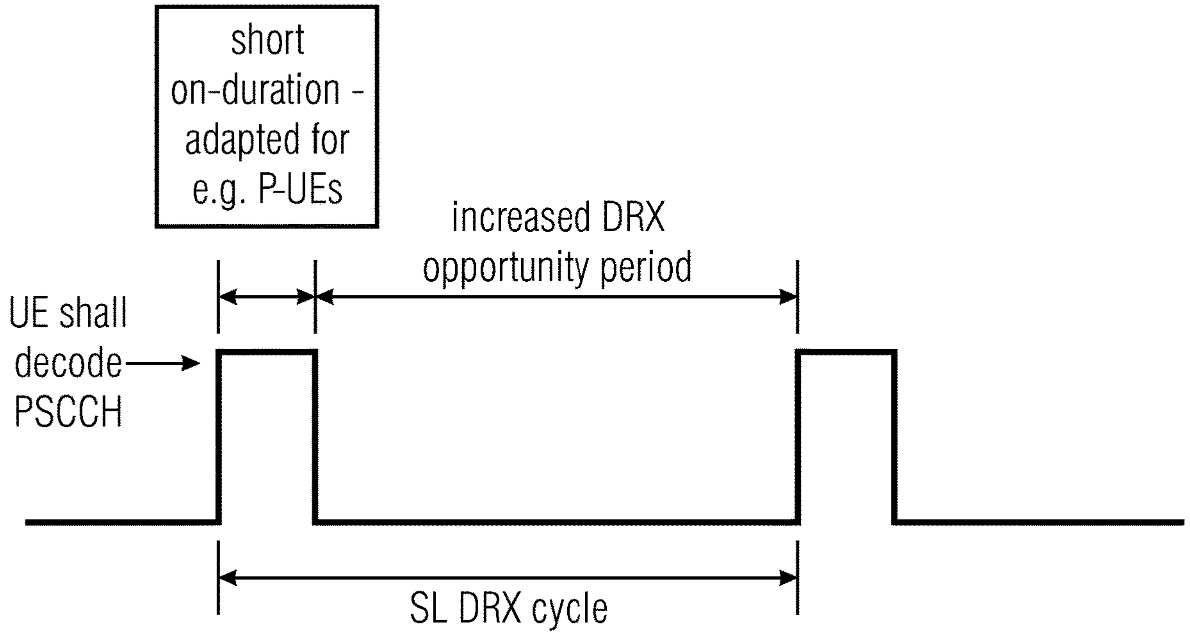
FIG. 11*b* shows in a diagram schematic illustrations of an adaptive SL on-duration in DRX cycle to save battery, e.g., for P-UE.

FIG. 11*a* shows in a diagram schematic illustrations of a mode 2 DRX cycle for SL, e.g., for V-UE, wherein FIG. 11*b* shows in a diagram schematic illustrations of an adaptive SL on-duration in DRX cycle to save battery, e.g., for P-UE.

2.1.1 Adaptation of DRX Cycle

The DRX cycle period should be adapted and optimized to minimize the UEs power consumption. Hence, the objective here is to extend the UEs sleep period(s), shorten the wake-up period(s) and wake up the UE only when needed. This does not exclude the possibility that DRX cycle period can be fixed for particular service(s) or the QoS flow(s). Here typically battery powered UEs are emphasized upon, e.g. P-UEs, cyclists as well as the V-UEs. Based on various factors for e.g. UEs conditions, preference, surrounding UEs in proximity and environmental conditions as well as scenarios, the DRX cycle on-off-periods and the respective timers may be adapted.

The following list of parameters are listed as example which impact the DRX cycle period (valid for both mode 1 and mode 2 UEs):

- Type of V2X message being exchanged between the UEs. For e.g.
  - CAM messages periodicity that is defined for the periodic messages for V-UEs (see e.g. ETSI 102 637-2 V1.2.1)
  - VAM messages which are defined specifically with regards to different profile of pedestrian UEs (ETSI and 5GAA)
  - CPM messages which are specific to the sensor data information exchange between V-UEs
  - DENM messages which are related to the aperiodic behavior of the traffic. Taking this sporadic transmissions into account the UE can for e.g. prolong its inactivity-timer-SL after receiving a DENM message.
- Relative speed between the UEs. DRX cycle adaptation is based on a threshold for comparison. When the relative speed between the UEs is above a certain threshold the DRX cycle can be configured as a shortDRXcycle-SL. Also, when the relative speed between the UEs is below a certain threshold the DRX cycle can be configured as a longDRXcycle-SL. This proposal will likely work better in case of a non-groupcast case.
- Local Speed for particular geographical areas. In this case, a particular geographical area for e.g. a city with its defined local speed limits can be the parameter for choosing a shortDRXcycle-SL or longDRXcycle-SL.
- Relative positioning of the UEs. DRX cycle adaptation is based on a threshold for comparison. When the relative position both longitudinal and lateral is below a certain threshold say for e.g. less than 0.5m a shortDRXcycle-SL can be configured for the UEs involved. Also, when the relative position both longitudinal and lateral is above a certain threshold say for e.g. more than 1 m a longDRXcycle-SL can be configured for the UEs involved. For e.g.
  - Based on distance P-UE→V-UE (profile of UE to be considered)
  - Longer DRX cycle: no SL signal (no close by V-UE)
  - Medium DRX cycle: low SL signal (V-UEs in some distance)
  - Shorter DRX cycle: medium/high TX signal
  - Sidelink RSS (proximity to other V-UEs)→the closer, the higher the risk (VRU safety)
- Note: For groupcast case, the relative positioning might not be a criteria as the UEs will already be in a group formation.
- Depending on the configured NR numerology e.g. subcarrier spacing for the UE, the DRX cycle can be optionally configured as a shortDRXcycle-SL. Else from a UE perspective it is beneficial that a longDRXcycle-SL is configured.
- Depending on the CBR levels measured of the resource pools, the DRX cycle can be adapted as longDRXcycle-SL or a shortDRXcycle-SL. For e.g. traffic load can be low, medium, high and accordingly DRX cycle can be adapted as longDRXcycle-SL or a shortDRXcycle-SL.
- Depending on the QoS flow or QoS profile configured for the UE, the service and the application it needs to support the DRX cycle can be adapted as longDRXcycle-SL or a shortDRXcycle-SL. For e.g. based on Priority/QoS/PDB of service/data
  - if high QoS→longer active period within DRX cycle
  - if low QoS→longer sleep period within DRX cycle
  - priority of other nearby UEs→relative priority.
- Depending on the RSRP/RSSI measurements derived between the UEs the DRX cycle can be adapted as longDRXcycle-SL or a shortDRXcycle-SL.
- Depending on the type of traffic to be supported i.e. periodic or aperiodic the DRX cycle can be adapted as longDRXcycle-SL or a shortDRXcycle-SL. For e.g. the DRXcycle on-off duration can be synonymous to the periodicity of the intended transmission which can be for e.g. deduced from SCI (both 1st and 2nd stage). This also includes can the adaptation of the DRXcycle based on reservation duration in SCI (resource reservation field).
- Depending on the UE capability the DRX cycle can be adapted. For e.g.
  - Type of battery: Dependency on VRU-UE type/power supply (e.g. a P-UE of an e-bike cyclist might be connected to the e-bike's battery, while pedestrians and non-e-bikes need to rely on the smartphone's battery only.

Note: This can be a UE implementation issue.
Battery status
Low battery status: extended off-period
Note: available to UE's modem.
UE profile such as the Pedestrians, cyclists, e-bike, Motorcyclists, etc.
If the UEs (both P-UEs and V-UEs) are in a clustered formation i.e. a groupcast case both ad hoc and a platoon then the DRX cycle can be adapted as longDRXcycle-SL or a shortDRXcycle-SL considering the following points
relative distance of UEs in proximity or w.r.t group members
QoS or priority of UEs in proximity or w.r.t group members
Synchronize on-/off periods
RSU/V-UE (e.g. traffic lights) as cluster head: source for synchronization
An appointed UE by higher layers via Destination Layer 2 ID acting as a group head and thereby configuring other UEs DRX cycles.
If the PSFCH is enabled or disabled.

Figure 12:
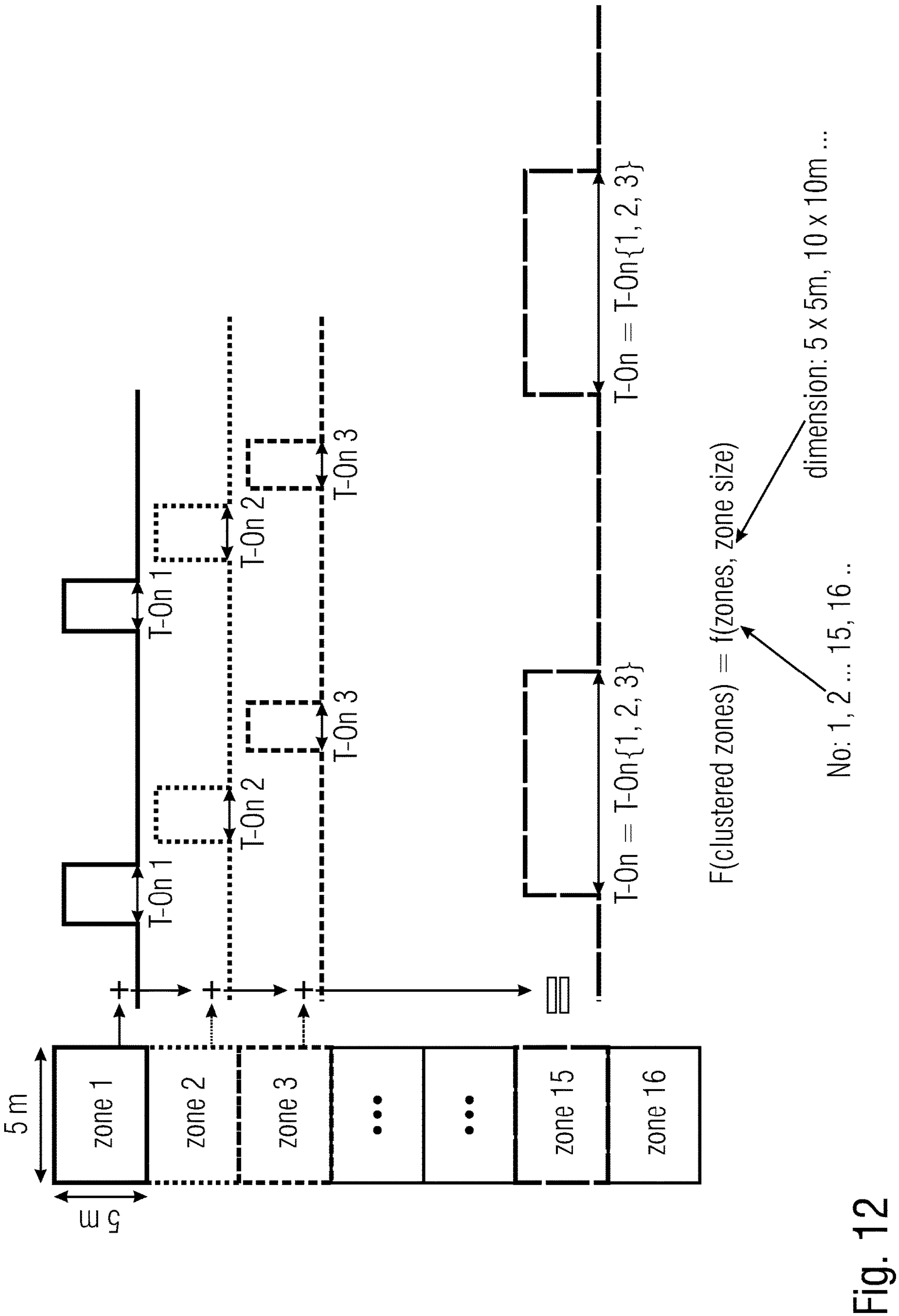
FIG. 12 shows a schematic illustration of an example of a DRX configuration in a group.

Thereby, FIG. 12 shows a schematic illustration of an example of a DRX configuration in a group.

Depending on the geographical location the UE is in for e.g. Proximity to road/crossing/junction/traffic light or zones or any hazardous situation as well as emergency situation the DRX cycle can be adapted as longDRXcycle-SL or a shortDRXcycle-SL.

If UEs are moving toward a new cell, e.g., handover case, DRX cycle can be adapted for the users that are located in overlapped area between serving and target cells via the gNB. For example, a validity area can be considered as a geographical area between two cells wherein a UE is configured to use a specific DRX cycle associated with the validity area. Wherein the DRX cycle associated with the validity area, is configured by the higher layer signaling, e.g., RRC.

2.1.2 Timers, Thresholds and Parameters to Adapt the On-/of-Duration within the DRX Cycle The RRC is responsible for providing configuration to the MAC CE with a DRX functionality that controls the UEs monitoring/listening activity for the respective MAC SL-RNTI, SLCS-RNTI and SL Semi-Persistent Scheduling V-RNTI in case of Mode 1 as well for the Mode 2 in-coverage scenario. Also, in Mode 1, the UEs can be configured with SL HARQ feedback along with DRX and PUCCH which reports this feedback configuration. When the MAC entity is configured with DRX operation, it shall monitor the respective control channels for SL (PSCCH) as well as the Uu (PDCCH) depending on the mode of operation of the UE. When the UEs are in RRC connected state, then MAC entity may monitor the PDCCH discontinuously depending on the configured DRX cycle period. While for the UEs in completely out of coverage the PC5-RRC shall provide the configuration to the MAC CE with DRX configuration or the MAC CEs DRX configuration shall be preconfigured.

The RRC controls the DRX operation for SL by configuring for e.g. at least the following parameters:
drx-onDurationTimer: the duration at the beginning of a DRX Cycle;
drx-SlotOffset: indicates delay before starting the drx-onDurationTimer;
drx-InactivityTimer: the duration after the PDCCH occasion in which a PDCCH indicates a new UL or DL or SL transmission for the MAC entity (fixed DRX inactivity duration);
drx-RetransmissionTimerSL (per SL HARQ process except for the broadcast case): the maximum duration until a SL retransmission is received by the UE;
drx-LongCycleStartOffsetSL: the Long DRX cycle and drx-StartOffset which defines the subframe where the Long and Short DRX Cycle starts depending on the parameters defined in 2.1.1;
drx-ShortCycleSL: the Short DRX cycle depending on the parameters defined in 2.1.1;
drx-longCycleSL: the long DRX cycle depending on the parameters defined in 2.1.1;
drx-ShortCycleTimerSL: the duration the UE shall follow the Short DRX cycle depending on the parameters defined in 2.1.1;
drx-HARQ-RTT-TimerSL (per SL HARQ process except for the broadcast case): this is the minimum duration before a SL assignment for HARQ retransmission is to be expected by the MAC entity;
preferreddrx-InactivityTimerSL: the UE can report a preference of the intended inactivity time as per the parameters discussed in 2.1.1 to the NW aligned with the UAI procedure (adaptive DRX)
preferreddrx-InactivityTimerSLGroup (in case of unicast or groupcast): the UE can report a preference of the intended inactivity time as per the parameters discussed in 2.1.1 to the NW aligned with the UAI procedure (adaptive DRX for groupcast or unicast).

The example of the corresponding DRX-Config information element in the RRC could be as follows. Thereby, in the below example, elements being highlighted in yellow may be provided, modified or changed according to the inventive approach described herein.

E.g. IE DRX-Config information element

```
-- ASN1START
-- TAG-DRX-CONFIG-START
DRX-Config ::=                      SEQUENCE {
        drx-onDurationTimer                 CHOICE {
                                                subMilliSeconds INTEGER
(1..31),
                                                milliSeconds ENUMERATED {
                                                    ms1, ms2, ms3, ms4, ms5,
ms6, ms8, ms10, ms20, ms30, ms40, ms50, ms60,
                                                    ms80, ms100, ms200, ms300,
ms400, ms500, ms600, ms800, ms1000, ms1200,
                                                    ms1600, spare8, spare7,
spare6, spare5, spare4, spare3, spare2, spare1 }
                                                },
```

-continued

E.g. IE DRX-Config information element

```
        drx-InactivityTimer                     ENUMERATED {
                                                        ms0, ms1, ms2, ms3, ms4, ms5,
ms6, ms8, ms10, ms20, ms30, ms40, ms50, ms60, ms80,
                                                        ms100, ms200, ms300, ms500,
ms750, ms1280, ms1920, ms2560, spare9, spare8,
                                                        spare7, spare6, spare5, spare4,
spare3, spare2, spare1},
        preferreddrx-InactivityTimerSL ENUMERATED {
                                                        ms0, ms1, ms2, ms3, ms4, ms5,
ms6, ms8, ms10, ms20, ms30, ms40, ms50, ms60, ms80,
                                                        ms100, ms200, ms300, ms500,
ms750, ms1280, ms1920, ms2560, spare9, spare8,
                                                        spare7, spare6, spare5, spare4,
spare3, spare2, spare1} OPTIONAL
}
preferreddrx-InactivityTimerSLGroup ENUMERATED {
                                                        ms0, ms1, ms2, ms3, ms4, ms5,
ms6, ms8, ms10, ms20, ms30, ms40, ms50, ms60, ms80,
                                                        ms100, ms200, ms300, ms500,
ms750, ms1280, ms1920, ms2560, spare9, spare8,
                                                        spare7, spare6, spare5, spare4,
spare3, spare2, spare1} OPTIONAL
}
         drx-HARQ-RTT-TimerDL                   INTEGER (0..56),
         drx-HARQ-RTT-TimerUL                   INTEGER (0..56),
         drx-HARQ-RTT-TimerSL                   INTEGER (0..56),
         drx-RetransmissionTimerDL              ENUMERATED {
                                                        s10, s11, s12, s14, s16, s18,
s116, s124, s133, s140, s164, s180, s196, s1112, s1128,
                                                        s1160, s1320, spare15, spare14,
spare13, spare12, spare11, spare10, spare9,
                                                        spare8, spare7, spare6, spare5,
spare4, spare3, spare2, spare1},
        drx-RetransmissionTimerUL               ENUMERATED {
                                                        s10, s11, s12, s14, s16, s18,
s116, s124, s133, s140, s164, s180, s196, s1112, s1128,
                                                        s1160, s1320, spare15, spare14,
spare13, spare12, spare11, spare10, spare9,
                                                        spare8, spare7, spare6, spare5,
spare4, spare3, spare2, spare1 },
drx-RetransmissionTimerSL               ENUMERATED {
                                                        s10, sl1, s12, s14, s16, s18,
sl16, s124, s133, s140, s164, s180, s196, sl112, s1128,
                                                        s1160, s1320, spare15, spare14,
spare13, spare12, spare11, spare10, spare9,
                                                        spare8, spare7, spare6, spare5,
spare4, spare3, spare2, spare1 },
        drx-LongCycleStartOffset                CHOICE {
             ms10                                       NITEGER (0..9),
             ms20                                       INTEGER (0..19),
             ms32                                       INTEGER (0..31),
             ms40                                       INTEGER (0..39),
             ms60                                       INTEGER (0..59),
             ms64                                       INTEGER (0..63),
             ms70                                       INTEGER (0..69),
             ms80                                       INTEGER (0..79),
             ms128                                      INTEGER (0..127),
             ms160                                      INTEGER (0..159),
             ms256                                      INTEGER (0..255),
             ms320                                      INTEGER (0..319),
             ms512                                      INTEGER (0..511),
             ms640                                      INTEGER (0..639),
             ms1024                                     INTEGER (0..1023),
             ms1280                                     INTEGER (0..1279),
             ms2048                                     INTEGER (0..2047),
             ms2560                                     INTEGER (0..2559),
             ms5120                                     INTEGER (0..5119),
             ms10240                                    INTEGER (0..10239)
        },
        drx-LongCycleStartOffsetSL              CHOICE {
             ms10                                       INTEGER (0..9),
             ms20                                       INTEGER (0..19),
             ms32                                       INTEGER (0..31),
             ms40                                       INTEGER (0..39),
             ms60                                       INTEGER (0..59),
             ms64                                       INTEGER (0..63),
             ms70                                       INTEGER (0..69),
```

-continued

E.g. IE DRX-Config information element

```
            ms80                                INTEGER (0..79),
            ms128                               INTEGER (0..127),
            ms160                               INTEGER (0..159),
            ms256                               INTEGER (0..255),
            ms320                               INTEGER (0..319),
            ms512                               INTEGER (0..511),
            ms640                               INTEGER (0..639),
            ms1024                              INTEGER (0..1023),
            ms1280                              INTEGER (0..1279),
            ms2048                              INTEGER (0..2047),
            ms2560                              INTEGER (0..2559),
            ms5120                              INTEGER (0..5119),
            ms10240                             INTEGER (0..10239)
        },
        shortDRX                        SEQUENCE {
            drx-ShortCycle                      ENUMERATED {
                                                    ms2, ms3, ms4, ms5, ms6,
ms7, ms8, ms10, ms14, ms16, ms20, ms30, ms32,
                                                    ms35, ms40, ms64, ms80,
ms128, ms160, ms256, ms320, ms512, ms640, spare9,
                spare8, spare7, spare6, spare5, spare4, spare3, spare2,
spare1 },
            shortDRXSL                      SEQUENCE {
            drx-ShortCycle                  ENUMERATED {
ms2, ms3, ms4, ms5, ms6, ms7, ms8, ms9, ms10, ms14, ms16, ms20, ms30,
ms32, ms35, ms40, ms64, ms80, ms128, ms160, ms256, ms320, spare11, spare10,
spare9, spare8, spare7, spare6, spare5, spare4, spare3, spare2, spare1 },
drx-ShortCycleTimer                 INTEGER (1..16)
            }
OPTIONAL,       -- Need R
drx-ShortCycleTimerSL                   INTEGER (1..16)
            }
OPTIONAL,       -- Need R
            drx-SlotOffset                  INTEGER (0..31)
}
-- TAG-DRX-CONFIG-STOP
-- ASN1STOP
```

| Extended DRX-Config field descriptions |
| --- |
| drx-HARQ-RTT-TimerDL<br>Value in number of symbols of the BWP where the transport block was received. |
| drx-HARQ-RTT-TimerUL<br>Value in number of symbols of the BWP where the transport block was transmitted. |
| drx-HARQ-RTT-TimerSL<br>Value in number of symbols of the BWP where the transport block was transmitted. |
| preferreddrx-Inactivity TimerSL<br>Value in multiple integers of 1 ms. ms0 corresponds to 0, ms1 corresponds to 1 ms, ms2 corresponds to 2 ms, and so on configured based on adaptive timers |
| preferreddrx-InactivityTimerSLgroup<br>Value in multiple integers of 1 ms. ms0 corresponds to 0, ms1 corresponds to 1 ms, ms2 corresponds to 2 ms, and so on configured based on adaptive timers |
| drx-InactivityTimer<br>Value in multiple integers of 1 ms. ms0 corresponds to 0, ms1 corresponds to 1 ms, ms2 corresponds to 2 ms, and so on. |
| drx-LongCycleStartOffset<br>drx-LongCycle in ms and drx-StartOffset in multiples of 1 ms. If drx-ShortCycle is configured, the value of drx-LongCycle shall be a multiple of the drx-ShortCycle value. |
| drx-LongCycleStartOffsetSL<br>drx-LongCycleSL in ms and drx-StartOffset in multiples of 1 ms. If drx-ShortCycleSL is configured, the value of drx-LongCycleSL shall be a multiple of the drx-ShortCycle value. Additionally, this configuration might fit more to the groupcast or unicast case. |
| drx-onDuration Timer<br>Value in multiples of 1/32 ms (subMilliSeconds) or in ms (milliSecond). For the latter, value ms1 corresponds to 1 ms, value ms2 corresponds to 2 ms, and so on. |
| drx-Retransmission TimerDL<br>Value in number of slot lengths of the BWP where the transport block was received. value s10 corresponds to 0 slots, s/1 corresponds to 1 slot, sl2 corresponds to 2 slots, and so on. |
| drx-Retransmission TimerUL<br>Value in number of slot lengths of the BWP where the transport block was transmitted. s10 corresponds to 0 slots, sl1 corresponds to 1 slot, sl2 corresponds to 2 slots, and so on. |
| drx-ShortCycle Timer |

-continued

| Extended DRX-Config field descriptions |
| --- |
| Value in multiples of drx-ShortCycle. A value of 1 corresponds to drx-ShortCycle, a value of 2 corresponds to 2 * drx-ShortCycle and so on.<br>drx-ShortCycle<br>Value in ms. ms1 corresponds to 1 ms, ms2 corresponds to 2 ms, and so on.<br>drx-SlotOffset<br>Value in 1/32 ms. Value 0 corresponds to 0 ms, value 1 corresponds to 1/32 ms, value 2 corresponds to 2/32 ms, and so on.<br>drx-ShortCycle<br>Value in ms. ms1 corresponds to 1 ms, ms2 corresponds to 2 ms, and so on.<br>drx-ShortCycle TimerSL<br>Value in multiples of drx-ShortCycle. A value of 1 corresponds to drx-ShortCycle, a value of 2 corresponds to 2 * drx-ShortCycle and so on. |

Similarly a corresponding DRX-Config information element in the PC5-RRC could be defined for the direction UE-UE as follows. Thereby, in the below example, elements being highlighted in yellow may be provided, modified or changed according to the inventive approach described herein.

E.g. IE SL-DRX-Config information element

```
-- ASN1START
-- TAG-DRX-CONFIG-START
DRX-Config ::=                        SEQUENCE {
        drx-onDurationTimer                     CHOICE {
                                                        subMilliSeconds    INTERGER
(1..31),
                                                        milliSeconds       ENUMERATED {
                                                             ms1, ms2, ms3, ms4, ms5,
ms6, ms8, ms10, ms20, ms30, ms40, ms50, ms60,
                                                             ms80, ms100, ms200, ms300,
ms400, ms500, ms600, ms800, ms1000, ms1200,
                                                             ms1600, spare8, spare7,
spare6, spare5, spare4, spare3, spare2, spare1 }
                                                        },
        drx-InactivityTimer                     ENUMERATED {
                                                        ms0, ms1, ms2, ms3, ms4, ms5,
ms6, ms8, ms10, ms20, ms30, ms40, ms50, ms60, ms80,
                                                        ms100, ms200, ms300, ms500,
ms750, ms1280, ms1920, ms2560, spare9, spare8,
                                                        spare7, spare6, spare5, spare4,
spare3, spare2, spare1},
        preferreddrx-InactivityTimerSL ENUMERATED {
                                                        ms0, ms1, ms2, ms3, ms4, ms5,
ms6, ms8, ms10, ms20, ms30, ms40, ms50, ms60, ms80,
                                                        ms100, ms200, ms300, ms500,
ms750, ms1280, ms1920, ms2560, spare9, spare8,
                                                        spare7, spare6, spare5, spare4,
spare3, spare2, spare1} OPTIONAL
}
        preferreddrx-InactivityTimerSLGroup ENUMERATED {
                                                        ms0, ms1, ms2, ms3, ms4, ms5,
ms6, ms8, ms10, ms20, ms30, ms40, ms50, ms60, ms80,
                                                        ms100, ms200, ms300, ms500,
ms750, ms1280, ms1920, ms2560, spare9, spare8,
                                                        spare7, sapre6, spare5, spare4,
spare3, spare2, spare1} OPTIONAL
}
          drx-HARQ-RTT-TimerSL                INTEGER (0..56),
drx-RetransmissionTimerSL             ENUMERATED {
                                                        s10, s11, s12, s14, s16, s18,
s16, s124, s133, s140, s164, s180, s196, sl112, s1128,
                                                        s1160, s1320, spare15, spare14,
spare13, spare12, spare11, spare10, spare9,
                                                        spare8, spare7, spare6, spare5,
spare4, spare3, spare2, spare1 },
        drx-LongCycleStartOffsetSL              CHOICE {
                ms10                                    INTEGER (0..9),
                ms20                                    INTEGER (0..19),
                ms32                                    INTEGER (0..31),
                ms40                                    INTEGER (0..39),
                ms60                                    INTEGER (0..59),
```

-continued

E.g. IE SL-DRX-Config information element

```
            ms64                                        INTEGER (0..63),
            ms70                                        INTEGER (0..69),
            ms80                                        INTEGER (0..79),
            ms128                                       INTEGER (0..127),
            ms160                                       INTEGER (0..159),
            ms256                                       INTEGER (0..255),
            ms320                                       INTEGER (0..319),
            ms512                                       INTEGER (0..511),
            ms 640                                      INTEGER (0..639),
            ms1024                                      INTEGER (0..1023),
            ms1280                                      INTEGER (0..1279),
            ms2048                                      INTEGER (0..2047),
            ms2560                                      INTEGER (0..2559),
            ms5120                                      INTEGER (0..5119),
            ms10240                                     INTEGER (0..10239)
        },
        shortDRXSL                                  SEQUENCE {
        drx-ShortCycle                              ENUMERATED {
ms2, ms3, ms4, ms5, ms6, ms7, ms8, ms9, ms10, ms14, ms16, ms20, ms30,
ms32, ms35, ms40, ms64, ms80, ms128, ms160, ms256, ms320, spare11, spare10,
spare9, spare8, spare7, spare6, spare5, spare4, spare3, spare2, spare1 },
drx-ShortCycleTimerSL                               INTEGER (1..16)
        }
OPTIONAL,        -- Need R
        drx-SlotOffset                                  INTEGER (0..31)
}
-- TAG-DRX-CONFIG-STOP
-- ASN1STOP
```

Additionally, a UE can also report its preferred DRX configuration as per the delay budget report it will include in the UE-Assistance information.

From the MAC perspective, When a DRX cycle is configured via RRC or PC5-RRC, the Active Time includes the time while at least the following conditions:

- drx-onDuration Timer or drx-InactivityTimerSL or drx-Retransmission TimerSL or preferreddrx-Inactivity-TimerSL or preferreddrx-InactivityTimerSLgroup or drx-Retransmission TimerUL is running; or
- a Scheduling Request that is already sent on PUCCH and is pending for a mode 1 UE; or
- a PDCCH that indicates a new transmission addressed to the SL-RNTI, SLCS-RNTI and SL Semi-Persistent Scheduling V-RNTI of the MAC entity has not been received after successful reception of a configured SL grant both type 1 and type 2

From the MAC perspective, when a DRX cycle is configured via RRC, it will take at least the following actions in for UEs in Mode1 and Mode 2 in coverage:

1. if a MAC PDU is received in a configured sidelink grant for the MAC entity's SL-RNTI or SLCS-RNTI:
   start the drx-HARQ-RTT-TimerSL for the corresponding Sidelink process in the first symbol after the end of the corresponding PUCCH transmission carrying the SL HARQ feedback;
   Stop the drx-RetransmissionTimerSL for the corresponding Sidelink process.
1. if a drx-HARQ-RTT-TimerSL expires:
   2. Start the drx-RetransmissionTimerSL for the corresponding Sidelink process in the first symbol after the expiry of drx-HARQ-RTT-TimerSL.
1. if the MAC entity is in Active Time:
   2. if the PDCCH indicates a SL transmission:
      start the drx-HARQ-RTT-TimerSL for the corresponding Sidelink process in the first symbol after the end of the corresponding PUCCH transmission carrying the SL HARQ feedback;
      Stop the drx-RetransmissionTimerSL for the corresponding Sidelink process.

Thereby, in the above example, a 1 is a start of a new condition, wherein subsequent numbers, i.e., 2, 3, . . . , are part of this condition.

From the MAC perspective, When a DRX cycle is configured via PC5-RRC, it will take at least the following actions in for UEs in Mode 2 out of coverage:

1. if a MAC PDU is received by the UE in Mode 2 out of coverage:
   2. start the drx-HARQ-RTT-TimerSL for the corresponding Sidelink process in the first symbol after the end of the corresponding PSCCH transmission carrying the SL HARQ feedback;
   2. stop the drx-RetransmissionTimerSL for the corresponding Sidelink process.
1. if a drx-HARQ-RTT-TimerSL expires:
   2. start the drx-RetransmissionTimerSL for the corresponding Sidelink process in the first symbol after the expiry of drx-HARQ-RTT-TimerSL.
1. if the MAC entity is in Active Time:
   2. if the PSCCH indicates a SL transmission (new or a retransmission):
      3. start the drx-HARQ-RTT-TimerSL for the corresponding Sidelink process in the first symbol after the end of the corresponding PSCCH transmission carrying the SL HARQ feedback;
      3. stop the drx-RetransmissionTimerSL for the corresponding Sidelink process.

Thereby, in the above example, a 1 is a start of a new condition, wherein subsequent numbers, i.e., 2, 3, . . . , are part of this condition.

Note that in embodiments, this MAC part still can be further extended with all the timers mentioned above in a similar manner.

2.2 Mechanism to Align Sidelink DRX Wake-Up Time Among Communicating UEs

Note that, in some embodiments, layer 2/layer 3 messages for synchronization between UEs to wake-up are preferred.

This embodiment focusses on specifying a mechanism in order to align the DRX cycles amongst the UEs communicating via SL communication via Layer 1, 2 as well as 3. In order to make sure that the UEs do not miss any information from the UEs in proximity while saving energy, the different DRX cycles have to be aligned. The UEs can be in either broadcast, unicast or groupcast communication. From a higher layer perspective i.e. layer 2 or 3, when the UEs are in a unicast or groupcast communication in Mode 2 then a PC5-RRC can be used to configure the MAC-CE in order to enable the alignment of the DRX cycles amongst the UEs. While Layer 1 can utilize the control information of the sidelink i.e. SCI (both or either the first or second stage) to align the DRX cycles amongst the UEs. Also, it is to be noted that when these procedures are also applicable when the UEs have multiple configured carriers or multiple active bandwidth parts.

2.2.1 Layer 2 and Layer 3 Mechanism

This option particularly discusses the case where UEs are communicating with other UEs via sidelink. The UEs can be either in unicast, groupcast or a broadcast communication. The UEs need to share the DRX assistance information with UEs at least in proximity or the ones who are member(s) of the group. The following options discusses the three cast types independently:

Broadcast Case

When the UEs are in broadcast communication, which is the baseline case, UEs need to explicitly share their DRX configurations with other UEs so that critical messages are not missed. For example based on the QoS including minimum communication range (geographical location) of the V2X service, a UE can broadcast its current DRX cycle length to other UEs. In turn, the other UEs will also broadcast their current DRX cycle lengths. Thus, each individual UE based on multiple DRX cycle lengths received from other UEs formulate a new DRX configuration. This case is valid only for UEs for whom the DRX configuration is enabled by the RRC configuration via the MAC. Also, in case of broadcast communication it is difficult to ensure that start of every UEs DRX configuration is the same. Hence, an alignment offset DRX duration can be provided to each UEs in their pre-configuration. This alignment offset DRX duration can be in order of milliseconds. Once a UE wants to broadcast its message to UEs in proximity it can first announce its own DRX configuration along with the possible alignment offset. This alignment offset can be for e.g. QoS dependent, V2X service dependent or could be even up to the UE implementation.

Unicast Case

In a unicast case, a connection is established between an initiating UE (e.g. TX-UE, TX UE with a L1/L2 source ID) and a target UE (e.g. RX UE, RX UE with a L1/L2 destination ID).

After a direct link establishment request, the unicast link is successfully established only if the request is accepted within a timer e.g. T5000 [38.331]. Hence, additional criteria for a target UE to accept this unicast link from the initiating UE can be their respective preferred DRX cycle. The misalignment of the DRX cycles is avoidable if the DRX cycle (e.g. preconfigured, preferred, or assigned) of the initiating UE is shared with the target UE (could be a non-DRX UEs) in the link establishment procedure.

Assuming, PC5-RRC dedicated configuration is established between two UEs the DRX cycles configured for respective UEs can be shared via existing information elements or via new ones e.g. assistance information message. For e.g. the DRX cycles can be appended to the UE capability information sidelink information element:

E.g. UECapabilityInformationSidelink

The IE UECapabilityInformationSidelink message is used to transfer UE radio access capabilities. It is only applied to unicast of NR sidelink communication [38.331]. Thereby, in the below example, elements being highlighted in yellow may be provided, modified or changed according to the inventive approach described herein.

UECapabilityInformationSidelink information element

```
-- ASN1START
-- TAG-UECAPABILITYINFORMATIONSIDELINK-START
UECapabilityInformationSideLink ::=          SEQUENCE {
        rrc-TransactionIdentifier-r16        RRC-TransactionIdentifer,
        criticalExtensions                   CHOICE {
            ueCapabilityInformationSidelink-r16          UECapabilityInformationSidelink-IEs-
r16,
            cirticalExtensionsFuture                     SEQUENCE { }
        }
}
UECapabilityInformationSidelink-IEs-r16 ::= SEQUENCE {
-- FFS on the details
        lateNonCriticalExtension             OCTECT STRING
OPTIONAL,
        nonCriticalExtension                 SEQUENCE { }
OPTIONAL
preferreddrx-InactivityTimerSL ENUMERATED {
                                                         ms0, ms1, ms2, ms3, ms4,
ms5, ms6, ms8, ms10, ms20, ms30, ms40, ms50, ms60, ms80
                                                         ms100, ms200, ms300, ms500,
ms750, ms1280, ms1920, ms2560, spare9, spare8,
                                                         spare7, spare6, spare5,
spare4, spare3, spare2, spare1} OPTIONAL
}
```

-continued

UECapabilityInformationSidelink information element

```
preferreddrx-InactivityTimerSLGroup ENUMERATED {
                                                            ms0, ms1, ms2, ms3, ms4,
ms5, ms6, ms8, ms10, ms20, ms30, ms40, ms50, ms60, ms80
                                                            ms100, ms200, ms300, ms500,
ms750, ms1280, ms1920, ms2560, spare9, spare8,
                                                            spare7, spare6, spare5,
spare4, spare3, spare2, spare1} OPTIONAL
}
drx-HARQ-RTT-TimerSL                INTEGER (0..56),
drx-RetransmillsionTimeSL           ENUMERATED {
                                                            s10, s11, s12, s14, s16,
s18, s116, s124, s133, s140, s164, s180, s196, s1112, s1128,
                                                            s1160, s1320, spare15,
spare14, spare13, spare12, spare11, spare10, spare9,
                                                            spare8, spare7, spare6,
spare5, spare4, spare2, spare1 },
drx-LongCycleStartOffsetSL                  CHOICE{
          ms10                                              INTERGER(0..9),
          ms20                                              INTERGER(0..19),
          ms32                                              INTERGER(0..31),
          ms40                                              INTERGER(0..39),
          ms60                                              INTERGER(0..59),
          ms64                                              INTERGER(0..63),
          ms70                                              INTERGER(0..69),
          ms80                                              INTERGER(0..79),
          ms128                                             INTERGER(0..127),
          ms160                                             INTERGER(0..159),
          ms256                                             INTERGER(0..255),
          ms320                                             INTERGER(0..319),
          ms512                                             INTERGER(0..511),
          ms640                                             INTERGER(0..639),
          ms1024                                            INTERGER(0..1023),
          ms1280                                            INTERGER(0..1279),
          ms2048                                            INTERGER(0..2047),
          ms2560                                            INTERGER(0..2559),
          ms5120                                            INTERGER(0..5119),
          ms10240                                           INTERGER(0..10239),
     },
shortDRXSL                          SEQUENCE {
     drx-ShortCycle                      ENUMERATED {
ms2, ms3, ms4, ms5, ms6, ms7, ms8, ms9, ms10, ms14, ms16, ms20, ms30,
ms32, ms35, ms40, ms64, ms80, ms128, ms160, ms256, ms320, spare11,
spare10, spare9, spare8, spare7, spare6, spare5, spare4, spare3, spare2,
spare1 },
drx-ShortCycleTimerSL               INTEGER (1..16)
     }
}
-- TAG-UECAPABILITYINFORMATIONSIDELINK-STOP
-- ASN1STOP
```

Another possibility is that a new IE for sidelink e.g. SLAssistanceInformation is defined that consists of all the timers mentioned in 2.1.2.

Groupcast Case

Groupcast can be seen from two perspectives one where there is a UE who is the Group lead of a group. The other case is an ad-hoc group case i.e. no group lead UE.

Group-lead case: Here it is easier to align the DRX cycles. We can assume that the UE appointed as a group-lead by the higher layers can instruct other UEs to follow its configured DRX cycle via PC5-RRC messages. In addition, an additional feature could be that the group members within a running timer sends their preferred DRX cycles to the group-lead UE. From the multiple received preferred DRX cycle the group lead UE choses one.

Adhoc-Group Case

Here, the case is similar to broadcast. For example, based on the QoS including minimum communication range (geographical location) of the V2X service, a UE can broadcast its current DRX cycle length to other UEs. In turn, the other UEs will also broadcast their current DRX cycle lengths. Thus, each individual UE based on multiple DRX cycle lengths received from other UEs formulate a new DRX configuration. This case of multiple DRX cycle lengths is valid only for UEs for whom the DRX configuration is enabled by the RRC configuration via the MAC. Otherwise all UEs are assumed to be a non-DRX UE which become DRX capable UE after receiving a configuration. Also, in case of broadcast communication it is difficult to ensure that start of every UEs DRX configuration is the same. Hence, an alignment offset DRX duration can be provided to each UEs in their pre-configuration. This alignment offset can be for e.g. QoS dependent, V2X service dependent, layer 2 destination ID, L2 ID, or could be even up to the UE implementation.

2.2.2 Higher Layer Mechanism with Layer 1 Impact

Here, assuming that the DRX configuration has already been carried out by the higher layers for e.g. like RRC or MAC, the control channel of the sidelink can align the different UEs DRX configurations. It is crucial that the wake-up time should be aligned with SCI periodicity/transmissions on the sidelink. As the UEs need to decode the SCIs (at least 1st stage SCI of relevant UEs), UEs need to be awake to perform SCI decoding. Not all sidelink SCI might be considered as relevant for decoding to increase the off-time of the UEs. Restrictions could be based on for e.g.

2nd stage SCI might not be required to be decoded.

Only relevant UEs SCI may need to be considered for decoding e.g.

UEs in proximity, e.g. based on relative distance between UEs; within the same zone; within the same group (groupcast, ad-hoc-group)

Some of the options of the DRX configurations are as follows:

2.2.2.1 Option 1: A Common DRX Configuration for Power Saving Enabled by Higher Layers Here in this option it is assumed that a common DRX configuration is sent to all users by RRC via the MAC. Based on the parameters mentioned in section 2.1.1 DRX configuration(s) can be configured by the RRC for the UEs. Further restriction in the sub-channel domain can be considered, which reduces the number of monitored SCI, resulting in additional power saving.

For e.g. P-UEs transmit high QoS message like emergency notification (but with high delay budget) during these DRX on-time. P-UEs with limited battery can reduce its activity to mostly monitor these common configuration based DRX channels. Thus, they can spend their limited power to receive only the high QoS profile like the emergency messages. To allow high QoS message like emergency notification with shorter delay budget, more common DRX configurations with shorter DRX cycle period can be defined.

In total, the effective DRX configured period of a P-UE is the union of the individual DRX configured periods used at the P-UE. This also gives a P-UE flexibility to dynamically choose which on-times to monitor. The number of sub-channels to monitor should be based on the number of expected UEs within a certain range (e.g. corresponding to a human reaction time) of a P-UE. This may be calculated using worst case numbers (e.g. corresponding to highest car speed) and set accordingly.

Also, for a specific case of groupcast a common DRX configuration can be done via for e.g. the PC5-RRC. For e.g. within a particular group like a platoon a specific DRX configured period could be defined and distributed to the member UEs by the group head via Established unicast links Broadcasted ad hoc group (e.g. P-UEs in proximity, any type of UE (V-UEs and P-UEs) to be considered for e.g. based on Zone ID This implies the UE selects an effective configured DRX period and broadcasts this DRX period as either a single fixed pattern for all UEs or individually configures a set of predefined DRX periods for every UE in this group. Other possibilities include that a randomly configured DRX period is selected by the leader UE for broadcasting to other UEs. Also, the group head UE can decide an effective configured DRX period based on the CBR of the configured resource pool for transmission.

2.2.2.2 Option 2: Geolocation-based DRX Configuration(s) for Power Saving Enabled by Higher Layers Note that in some embodiments, geolocation might be defined as any geographical area, e.g. zone validity area, cluster of neighboring zones or validity areas or clusters of zone or validity areas. In the explanation here we have referred geolocation as zones.

One use of zone based approach is to reduce collisions. If different configured DRX periods (e.g. with non-overlapping time shifts) are associated to a zone ID, the number of V-UEs simultaneously transmitting in the same on-time is reduced. This idea is problematic if the zones are small. For example, if the zone is 5m×5m, a P-UE in that zone misses the transmission from neighboring zones even though these areas are close by. However, this issue can be solved in the following way. If a P-UE knows the neighboring zone IDs and the zone size, it will be able to determine which zones are nearby and monitor using configured DRX periods corresponding to its current zone and neighboring zones. This allows the P-UE to receive information from fast moving V-UEs, which may be only at a several seconds distance from the P-UE but at a different zone. The cost is that the P-UE has to monitor multiple configured DRX periods, which decreases the battery level. The table 1 below shows an example of the explained idea in the above lines:

TABLE 1

Monitoring N zones for multiple configured DRX patterns

| Zone dimension (meters) | N- Number of neighboring zones | Monitored pattern of zones |
|---|---|---|
| 1 | 7 | e.g. UE in zone 1 monitors patterns of zones [16, 15, 14, 1, 3, 2] |
| 5 | 5 | e.g. UE in zone 1 monitors patterns of zones [15, 14, 1, 3, 2] |
| 20 | 3 | e.g. UE in zone 1 monitors patterns of zones, 3, 1, 2] |

FIG. 12 explains the idea further. In Detail, FIG. 12 shows a schematic illustration of a UE within a 5×5 m configured zone monitors multiple configured DRX patterns of nearby zones in order to formulate a common DRX configuration so that it is able to receive messages from everyone in proximity.

Another possibility with zones is that it allows the number of sub-channels to be monitored during DRX on-time to be scaled with the size of the zone. For a given density, the number of V-UEs is proportional to the zone area. Thus, it is beneficial that the number of sub-channels to be monitored scales with area to reduce the sub-channel blockage or collisions. The zone approach has the flexibility to limit the numbers of zones monitored by a P-UE. It also allows to adjust the number of sub-channels to be monitored to match the local density in the zone. For e.g. if the zone size is 5m×5m, then the UE can decide to monitor sub-channels as well as listen to the nearby zones based on a scaling factor. The table 2 gives a possible dependency considering the sub-channels, zone dimension and the bandwidth part

TABLE 2

Zone dimension and sub-channel relation

| Zone dimension (m) | Percentage of Bandwidth Part | Resource block index |
|---|---|---|
| 1-5 | 5 | 1, . . . [$N_{RB}$ × 5/100] |
| 5-10 | 10 | 1, . . . [$N_{RB}$ × 10/100] |
| 10-20 | 20 | . . . |
| 500 m | . . . | . . . |

2.2.2.3 Option 3: Alignment of UEs Through Synchronization Signal Block (SSB) in Out of the Coverage Scenarios Out of coverage UEs may use SSB to exchange DRX configuration. As all UE shall listen to SSB resources of Physical Broadcast Channel (PBCH) for synchronization and detection of new cell, the SSB resources may be used by UEs to exchange DRX configuration even if their DRX configurations are different.

The time and frequency location of SSB in NR may vary based on the subcarrier spacing but it can be pre-configured by gNB.

2.2.3 Sources for DRX Configuration

A UE may have the following sources for DRX configuration:

Option 1: Synchronization source. UE may use its synchronization source for DRX configuration.

Option 2: Base station e.g. gNB. A UE may receive DRX configuration from a base station e.g. gNB Option 3: Another SL linked UE (P-UE, V-UE acting as GL). A UE may receive the DRX configuration from another UE through PC5 interface. Another UEs may relay the DRX configuration to the UE.

Option 4: RSU (gNB type or the UE type). A UE may receive the DRX configuration from a Road Side Unit (RSU) when it is in vicinity of the RSU. In this case, the DRX configuration may be geo-location dependent e.g. the DRX configuration for a junction or part of a motorway.

Figure 13:
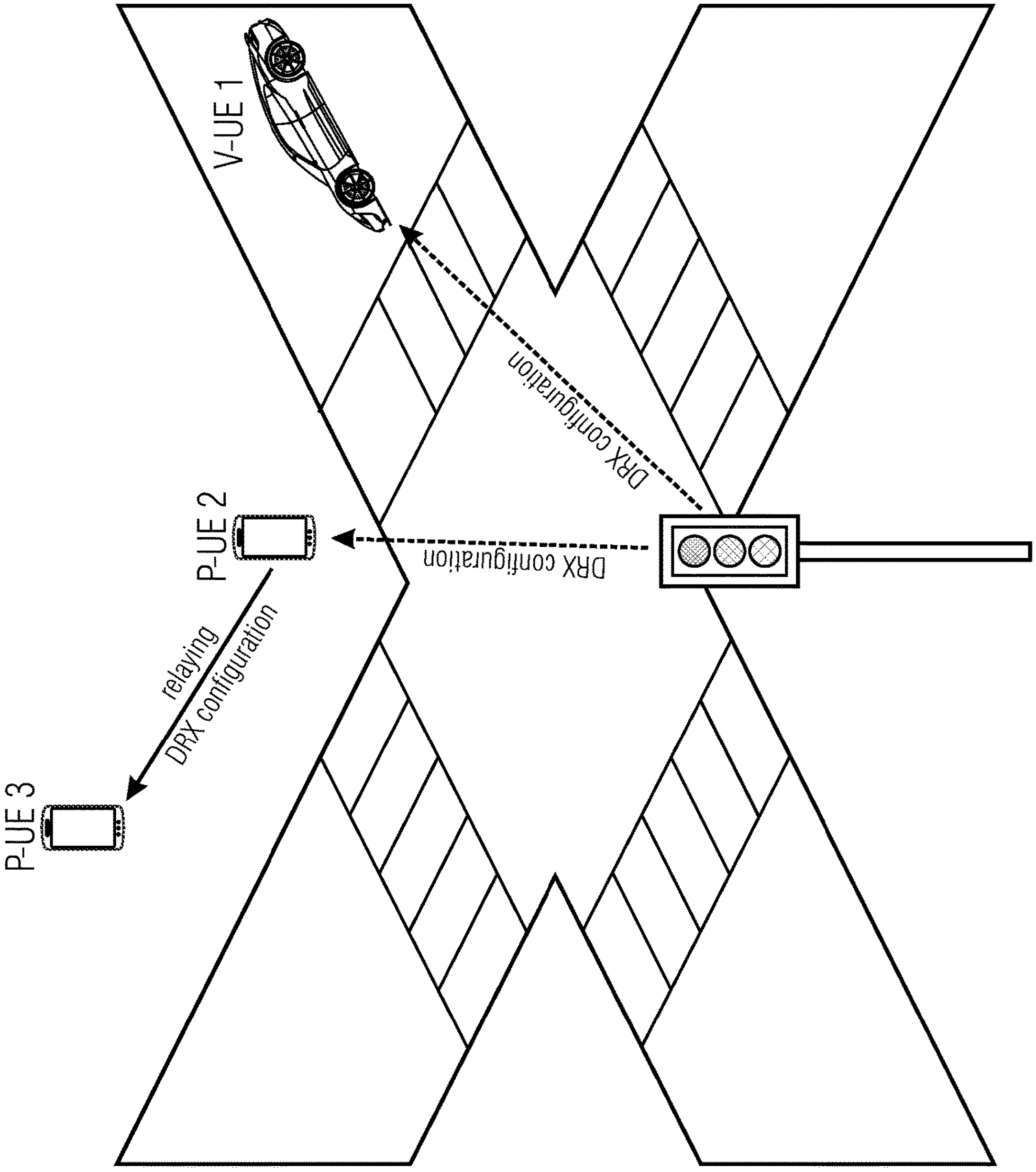
FIG. 13 shows an illustrative view of an example of a DRX configuration by a RSU.

FIG. 13 shows an illustrative view of an example of a DRX configuration by a RSU.

2.2.3.1 Conflicting Sources for DRX Configuration

There can be a hierarchical hierarchal order between these options and based on the availability as well as the hierarchy the UE can chose a DRX source. The hierarchy can be pre-configured or decided by a UE based on some conditions such as geographical location, group case.

2.3 Mechanism to Align Sidelink DRX Wake-Up Time with Uu DRX Wake-Up Time for in-Coverage UEs In accordance with embodiments, the idea is to align/synchronize the sidelink and Uu DRX wake-up time/on-duration e.g. by synchronizing SL on-time with DL on-time as a UE may save more battery, while Uu and SL remaining in sleep mode simultaneously for extended periods.

2.3.1 Alignment of Uu and Sidelink Wake-Up/On-Duration Time

Note that in embodiments, wake-up time and on-duration can be seen here as interchangeable.

1. Option: Completely Overlapping Wake-Up Times on Uu and SL(s)

For DRX, the SL on-duration is completely aligned with the Uu on-duration, i.e. the SL and Uu on-duration completely overlap, i.e. the wake-up time for Uu and SL are fully aligned. This could apply for DRX Uu long and short cycles.

2. Option: Fractional Alignment of Wake-Up Times on Uu and SL(s)

For DRX, the SL on-duration is aligned with Uu on-duration, but as a fraction of the period (½, ¼, etc.) of Uu on-duration. One example is shown in FIG. 12 indicating that the SL on-duration is restricted to the Uu on-duration. However, different to option 1, the SL and Uu on-duration does not completely overlap. The SL on-durations could be any kind of fractions within the Uu on-duration. There could be just one SL on-duration during the Uu on-duration, which would be shorter than the Uu on-duration. Alternatively, there could be multiple shorter SL on-durations (e.g. due to shorter SL cycles) during one or each Uu on-duration as shown in FIG. 12 for 2 short SL on-durations within one Uu on-duration. In addition, independent of a DRX Uu long or short cycles, the following options could apply.

Figure 14:
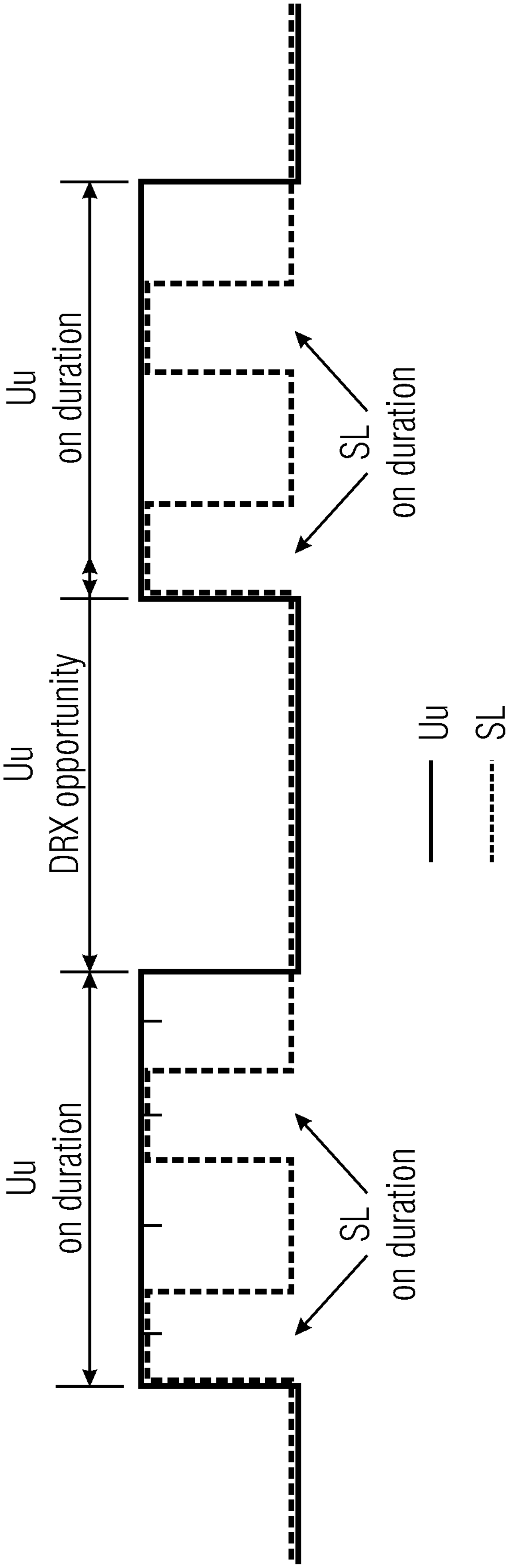
FIG. 14 shows in a diagram a schematic illustration of a fractional alignment of SL on-duration within Uu on-duration.

- the Uu DRX active time, could be further split into one or multiple SL active time. Each SL active time would be regarded as a fraction of Uu wake-up time.
- the SL wake-up time could also use a (configured) offset (time), which defines a time offset for the SL wake-up time after the start of the Uu DRX wake-up time.
  - the offset could for example depend on the delay budget report included in the RRC IE UE assistant information or a newly added DRX IE (see section 2.1)
  - the SL wake-up time could be restricted to every x-th Uu wake-up time. For example, for x=2, the SL would wake up on during every $2^{nd}$ Uu DRX wake-up time FIG. 14 shows in a diagram a schematic illustration of a fractional alignment of SL on-duration within Uu on-duration.

3. Option: Align Sidelink DRX Wake-Up Time with Multiple Sidelinks

For UE is in coverage, it is possible that one or more sidelink are configured in mode 1 and in addition one or more sidelinks are configured in mode 2. For this case, the sidelink(s) are expected to be used for unicast and/or groupcast configuration.

As a consequence the wake-up time of the sidelinks should be aligned using the same or consecutive wake-up times. For example in case of 3 sidelinks, the first SL DRX wake-up time applies to receive/decode sidelink1, the consecutive SL DRX wake-up time applies to SL 2 and the next following SL DRX wake-up time to sidelink 3. The SL DRX wake-up time for the different sidelinks could be concatenated (e.g. to minimize the delay) or distributed within one Uu DRX wake-up time or distributed over multiple Uu wake-up times (e.g. per Uu wake-up time one SL DRX wake-up time may apply.

Otherwise, the same options as listed in Option 2. apply.

4. Option: Align Uu DRX Wake-Up Time with SL Wake-Up Time Aligned with Multiple UEs in Proximity The UE on the sidelink may have to receive and decode signals from multiple UEs on the sidelink in proximity. This is especially the case for broadcast communication, where transmissions from multiple UEs in proximity might need to received and decoded. Also in case of groupcast communication transmissions of all UEs of the group(s) a UE belongs to need to be received and decoded.

Therefore, the Uu DRX wake-up time has to be aligned with SL DRX sidelink wake-up times to allow UEs to receive data from multiple UEs in proximity.

An overall configuration of the SL DRX periods (wake-up time) for a UE should take both into account:

- SL specific wake-up time(s) to receive transmissions from UEs in proximity (e.g. to receive broadcast and/or groupcast and/or unicast information) and
- DRX Uu wake-up time To optimize the SL DRX times, i.e. minimize the wake-up time(s) for multiple sidelinks, UEs in proximity could use the identical SL wake-up times—at least for broadcast and groupcast. This could be achieved, if UEs in proximity use the identical SL wake-up time based e.g. on the geographical area or a relative distance between UEs. The SL wake-up time could be associated e.g. to

- the minimum communication range or
- a zone or validity area or a cell or a cluster of neighboring zones or cells 5. Option: Wakeup Alignment Between LTE and NR Sidelink with Sidelink(s) in Either Mode 1 and/or Mode 2

A UE configured with both, an LTE and an NR sidelink, may align wake up time and on/off duration parameters through the higher layer signaling in Mode 1 or preconfigured parameters in Mode 2 or one of sidelink configuration parameters is taken into consideration as a preferred configuration for LTE and NR sidelink.

SL DRX mode 2 configuration, e.g. wake-up times could also be reported to the network to enable the neatwork to align the different DRX wake-up times.

Preference to LTE or NR sidelink configuration is seen as an option for alignment between the sidelink DRX configurations between RATs. For example, LTE wake up time and on/off duration parameters might be preferred to be used by the LTE and NR sidelink.

Alternatively, when a PFSCH is configured for a RP in NR sidelink communication, NR sidelink wake up time and on/off duration may be considered for LTE and NR sidelink.

2.3.2 Mechanisms for Alignment

For Uu DRX in Rel-16 only on-duration and inactivity-timer duration are signaled to the UE by the eNB. The active- or wake-up time is of varying duration based on e.g. scheduling decision and UE decoding success.

Considering and aligning the sidelink DRX wake-up time with Uu DRX wake-up time considers in coverage scenarios only, where the network, typically the gNB is expected to control the DRX configuration-considering both, the Uu and the SL(s). Without DRX on the sidelink, the network configures the DRX individually for each UE based on e.g. individual UL/DL traffic pattern.

Adding DRX on the sidelink to DRX on Uu demands that the network has to know and consider additionally the sidelink specifics, e.g. the sidelink traffic pattern. The network may need to be informed from the UE about e.g. the current/planned SL traffic pattern by receiving this information in reports. One or more sidelinks on different RATs (e.g. LTE and NR) and different modes (e.g. mode 1/mode 2 in NR) may be configured at the same UE.

The example procedure below indicates, how the network may be able to configure DRX for Uu and sidelink(s):

1. UE transmits sidelink information (e.g. traffic patterns) for each sidelink (assuming DRX is enabled) configured at the UE to the network,
   - One option is to include this information (e.g. SL traffic patterns) in the RRC "UE Assistance Information", if configured to do so (other RRC messages or IE are not precluded) where one of the following options could apply
     - Use the UE's delay budget report to retrieve this information
     - Adapt the delay budget report adding e.g. further relevant details e.g. traffic patterns to configure the DRX timers
     - Add a new IE indicating the sidelink traffic pattern and/or other details to enable the network to configure DRX.
   - Besides the traffic pattern, further sidelink information may be included, e.g. priority, cast type, HARQ settings and/or configuration (DRX enabled or not, HARQ configuration)
2. Network sends a DRX configuration to the UE considering the Uu and sidelink(s) setups and traffic patterns.
   - The DRX configuration may consist of one combined DRX configuration for SL and Uu or extra Uu and SL DRX configurations.
   - The existing Uu DRX timers could be completely or partly reused for the sidelink, e.g. wake-up timer, on-duration timer, inactivity-timer.
   - Alternatively, a new set of SL timer could be introduced, e.g. sidelink wake-up timer, sidelink on-duration timer, sidelink inactivity-timer.
   - A timer-offset may be specified, which defined the wake-up offset from the Uu wake-up time to the sidelink wake-up time. In the same manner, offsets for Uu on-duration and Uu inactivity timer may be defined for the sidelink
   - In addition, the UE could add an indication to change/adapt the DRX configuration on the longer term or immediately or requests an exceptional immediate or delayed wake-up time.
   - E.g. in case of an aperiodic high priority transmission is expected to be received, the UE may need an immediate wake-up time. Then, the network may adapt the DRX configuration accordingly or may signal an immediate wake-up request, e.g. sending an immediate wake-up indication (e.g. wake-up signal).
   - Additionally or alternatively, a MAC or an RRC control message could enable or disable DRX on the sidelink. E.g. in case of any critical scenarios or traffic areas (e.g. road intersections), the network may disable DRX to ensure that the UE is continuously able to receive messages. When the critical scenario or area is over/passed DRX maybe enabled again.

Note that in embodiments, the timers from section 2.1.2 could be considered here as well. This includes that the setting DRX configuration/alignment of Uu and sidelink, also considers SL specific timers for retransmission and HARQ, e.g. drx-RetransmissionTimerSL, drx-HARQ-RTT-TimerSL.

2.3.3 Long and Short DRX Cycle for the Sidelink

There are at least two major type of traffic patterns on the sidelink:

- Periodic traffic: e.g. used for exchange of CAM messages in broadcast communication or partly exchange of status information in groupcast.
- Aperiodic traffic: e.g. used for unicast, (partly) groupcast as well as in case of unexpected events—also in broadcast.

To efficiently map the different traffic types to sidelink DRX,

- a sidelink broadcast cycle or sidelink long cycle may be introduced. The timer setting or duration may be aligned e.g. to the CAM periodicity.
- Additionally, a SL unicast or short cycle may be introduced. This type of cycle may be configured only in case a unicast or groupcast link is established. In

- addition, it could also be configured during specific scenarios (e.g. high traffic) or in critical geographical areas (e.g. intersection).
- As a third cycle, a groupcast cycle may be defined, which is configured for DRX based on the groupcast specific application.

The different sidelink cycles may also need to be aligned with Uu cycles, which considers short and long DRX cycles.

2.3.4 RRC Idle or RRC Inactive UEs

When the UE is in RRC_IDLE or RRC_INACTIVE, this UE is required to only monitor paging channels during one Paging Occasion (PO) per DRX cycle (see TS 38.304 Paging_DRX). In case a sidelink is established, while the UE is in RRC_Idle or RRC_Inactive, the sidelink may be considered in mode 2 (especially in case of RRC_Idle), but also in mode 1 (possibly in RRC_Inactive).

In both states, the SL DRX configuration/timers could be aligned with the Uu DRX cycle for the Paging Occasion (PO). If the PO DRX cycle duration exceeds the SL required DRX cycle duration, additional wake-up periods in between the Uu wake-up times should be configured. Note: The preceding subsection of 2.3 typically refer to UEs in RRC_Active as well as RRC_Inactive.

2.3.5 Alignment Dependent on Coverage of UEs

In section 2.3 typically in coverage UEs are considered, i.e. both UEs communicating in unicast are in coverage or all UEs receiving broadcast information are in coverage.

There are "specific" coverage scenarios, which need extra considerations:

- partial coverage (e.g. unicast or groupcast, where at least one UE is in coverage and at least another UE is out-of-coverage): the UE in out-of-coverage follows the DRX configuration of the UE in coverage. The in-coverage UE could forward the DRX configuration to the out-of-coverage UEs, whenever a uni- or groupcast link is established.
- short out-of-coverages exceptional case: until RLF is declared, the DRX configuration remains as defined for the in coverage scenario.

2.4 Relay Assisted DRX

A UE (e.g. P-UE) broadcasts/groupcasts/unicasts a relaying request and the DRX pattern (explicit or implicit, e.g. based on zone ID or geographic position). Vehicular UEs or any other types of UEs in the same geographical area/zone that can assist respond with a groupcast or unicast message to the UE (e.g. P-UE).

UE (e.g. P-UE) selects one or a few of these V-UEs/other type of UEs by sending a unicast/groupcast message considering

- These V-UEs/other type of UEs know when UE (e.g. P-UE) is ON in DRX and the monitored subchannels
- These V-UEs/other type of UEs can send their individual (unicast or groupcast) messages to the UE (e.g. P-UE) during the ON time of the P-UE
- These UEs (e.g. V-UEs) can buffer (critical broadcast) messages from non-relay UEs (e.g. V-UEs) and forward them during the ON time of the P-UE via unicast/groupcast
- A relay may be capable to extend the on-time of DRX of the UE (e.g. P-UE) (using some signaling) such that the buffered messages can be delivered (e.g. if the relay to UE (e.g. P-UE) link is good (e.g. exceed a defined threshold related to interference and/or traffic load), these messages can be delivered in a short (er) interval and thus gives more power saving).
- The service ends based on geographic position or relative distance between the UEs e.g. when the relay leaves neighborhood (zone far away or high path loss). This may be unicast to the UE (e.g. P-UE).

The following options (individual or in combination) can be considered for selecting a relay node:

- Signal power-based relay selection (higher MCS allows shorter transmission time and longer sleep duration).
- Battery power-based relay selection, e.g. in case of low battery of a P-UE, the P-UE may select a relay which allows to transmit signals with less TX power).
- Mobility based relay selection (e.g. based on static/moving, moving speed, moving direction)
- Zone based relay selection.
- Position based relay selection (e.g. based on geographic position of P-UE and/or relay or relative position between UEs)

A relay UE may be a new capability and thus can be activated through the higher layer signaling, e.g., RRC signaling message.

2.5 DRX Configuration Considering Resource Re-Evaluation, Preemption and Re-Transmission

TABLE 3

Options of DRX related timers per cast type

| Timers | Broadcast | Groupcast | Unicast |
|---|---|---|---|
| Required/ Necessary | ON duration | ON duration<br>HARQ RTT | ON duration<br>HARQ RTT<br>Inactivity timer |
| Optional/ Conditional | Inactivity timer | Inactivity timer | |

Conditions to apply inactivity timer/HARQ_RTT for groupcast/unicast (see Table 3):

- Inactivity timer in case of groupcast/unicast, if applied then the MAC CE should take into account the possible NACKs to be received. The duration of the inactivity timer may be proportional to number of feedback instances to be received. This duration of the inactivity timer may also consider the number of retransmissions in the control information of sidelink e.g. SCI format 0-2.
- In case if only feedback (e.g. NACK/ACK) is expected by the UE, then, as an option, only HARQ_RTT timer could be active.
- Else if the TX has already made reservations in the first on-duration then it is known where the repetition will happen. Hence, in this case the presence of an inactivity timer along with HARQ_RTT timer would be helpful in maintaining the reliability.
- Also, if the UE has been doing sensing and if the sensing results were not adequate and the UE decides to do a re-evaluation, then the inactivity timer is started in order to extend UEs active time and the UE may enhance the quality of the prior sensing results.

Conditions to apply inactivity timer for broadcast (see Table 3):

- In case of broadcast as it is hard to figure out when the next retransmission will happen as there is no mechanism like indicating beforehand that a UE is expecting a retransmission w.r.t current service. Hence, the configuration of the inactivity timer can be derived based on the criteria from which the UE choses it's initial (common) DRX configuration, for example E.g. if the DRX configuration is based on PQI and suppose one of the current services that UE is supporting has highest PQI. Then, at least corresponding to this PQI, the inactivity timer should be enabled.

Another possibility could be corresponding to the Destination IDs to which the UE is transmitting again to. If the same Destination IDs are used for transmission as for the previous transmission then the inactivity timer can be enabled as well.

Also, if the UE has been doing sensing and if the sensing results are not adequate and the UE decides to do a re-evaluation then inactivity timer is started in order to extend UEs active time and the UE can be sure of enhancing the prior sensing results.

2.6 DRX Configuration Procedure in Case of Unicast

From initiating UE perspective:

One is about the target UE mandated to follow the same DRX configuration.

Target UE does not accept the DRX configuration suggested by the initiator (e.g. TX) UE.

Initiating UEs send additional information such as battery power, location information, CBR information, CSI information along with the initiating UE DRX configuration to help target UE (e.g. RX UE) to adapt or make an informed decision regarding choice of DRX configuration.

The container for this information exchange can be a higher layer message like PC5-S or PC5-RRC or any UAI message within the RRC.

From target UE perspective:

In this case the flow of information is from the target UE (RX side) to the initiator UE (TX side) then the target UE (RX side) proposes or dictates the initiator UE (TX side) which DRX configuration it may/will follow/it has. This behavior might make the initiator UE (TX side) activate the inactivity timer and stay in the active duration longer. This will in turn result in more power consumption on the initiator UE (TX side) side.

Also, even at the receiver side the UE might need to stay awake for longer duration compared to active time because of possible re-transmissions from the initiator UE (TX side).

Target UEs may send additional information such as battery power, location information, CBR information, CSI information along with their DRX configuration to help initiator UE (e.g. TX UE) to make an informed decision regarding choice of DRX configuration.

The container for this information exchange can be a higher layer message like PC5-S or PC5-RRC or RRC e.g. any UE-assistance information (UAI) message.

2.7 Conditions for Different DRX Configurations & Timers

Details of how to maintain the agreed timers including exact definition of timers, how to set the timers, when to start/restart/stop the timers, additional consideration due to SL characteristics, considerations of both RX UE and its peer TX UE sides.

- Maintenance of ongoing timers
  - Start of the timers:
    - Packet arrival/traffic triggered,
    - UE triggered i.e. RX or TX specifically requests the DRX timer to start based on any criteria mentioned in 2.1.1,
    - BS triggered.
  - Stopping the timers:
    - Exceptional conditions such as RLF.
    - No response (acknowledgement) from a UE (TX, RX) beyond a certain validity time or defined period,
    - lack of alignment information from the UE (TX, RX) side,
    - lack of assistance information from the UE or BS side,
    - lower battery level,
    - completion of ongoing service,
    - pre-emption due to higher QoS (e.g. priority service),
    - failure in the negotiation procedure from either UE (TX or RX) side

2.8 Further Embodiments

Embodiments described herein allow for saving UE battery, that is especially required for battery powered VRU-UE with V2X application. Otherwise, if UEs run out of battery, safety critical messages might not be received. Also, VRUs may not use V2X application if the power consumption is considered high.

Figure 15:
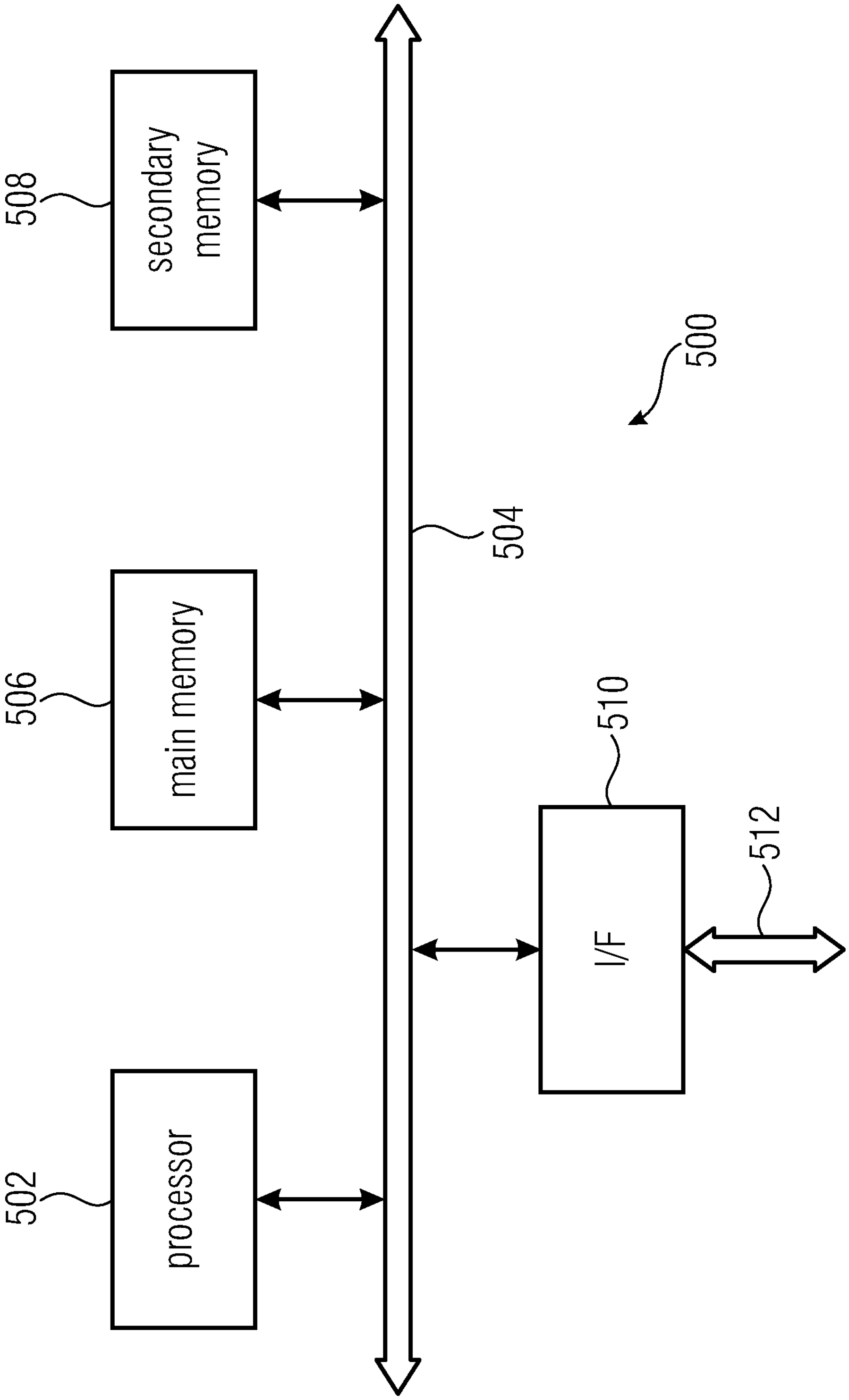
FIG. 15 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 15 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

REFERENCES

[1] TS 38.300 (Rel-16)-DTX Overview NR on Uu
[2] TS 38.331 RRC: DTX details
[3] TS 38.321 Medium Access Control (MAC) protocol specification (Release 16); V16.0.0; 2020-03; Section 5.7 DRX (for Uu interface)
[4] RP-193231 New WID on NR sidelink enhancement
[5] TS 36.300

Abbreviations

WUS Wake-up signal
VRU Vulnerable road user
DRX Discontinuous reception
V-UE Vehicular UE
P-UE Pedestrian UE: should not be limited to pedestrians, but represents any (mostly battery-based) UE with a need to save power, e.g. electrical cars, cyclicsts, vulnerable road user
UE User Equipment
SL sidelink

The invention claimed is:

1. Transceiver of a wireless communication system, wherein the transceiver is configured to operate in a sidelink in-coverage, out of coverage or partial coverage scenario, in which resources for a sidelink communication over a sidelink are pre-configured by the wireless communication system or allocated or scheduled autonomously by the transceiver, wherein the transceiver is configured to receive, in the sidelink in-coverage, out of coverage or partial coverage scenario, sidelink signals from at least one other transceiver of the wireless communication system using a discontinuous reception, DRX, mode of operation, wherein the transceiver is configured to adjust at least one parameter of a sidelink discontinuous reception, DRX, cycle describing periods during which sidelink signals are received in the discontinuous reception, DRX, mode of operation in dependence on at least one other discontinuous reception, DRX, cycle used by the at least one other transceiver, wherein the transceiver is configured to transmit a sidelink control signal to the at least one other transceiver, the sidelink control signal comprising an information describing the discontinuous reception, DRX, cycle used by the transceiver, wherein the transceiver is a user equipment, wherein the transceiver is configured to align the discontinuous reception, DRX, cycle to the at least one other discontinuous reception, DRX, cycle used by the at least one other transceiver.

2. Transceiver according to claim 1, wherein the at least one parameter of the sidelink discontinuous reception, DRX, cycle is at least one out of:

a period of on-periods of the discontinuous reception, DRX, mode of operation, a period of off-periods of the discontinuous reception, DRX, mode of operation, a timing of on-periods of the discontinuous reception, DRX, mode of operation, a timing of off-periods of the discontinuous reception, DRX, mode of operation, an active-time of the discontinuous reception, DRX, mode of operation.

3. Transceiver according to claim 1, wherein the transceiver is configured to transmit the sidelink control signal in response to a reception of a link establishment request received from the at least one other transceiver.

4. Transceiver according to claim 3, wherein the transceiver is configured to receive an assistance information from the at least one other transceiver during the link establishment procedure, wherein the assistance information describes a preferred discontinuous reception, DRX, cycle of the at least one other transceiver.

5. Transceiver according to claim 4, wherein the transceiver is configured to receive a control signal from at least one other transceiver of the wireless communication system, wherein the control signal comprises a further information describing an operating condition of the other transceiver, or wherein the transceiver is configured to receive a further control signal from the other transceiver, the further control signal comprising a further information describing an operating condition of the transceiver, wherein the operating condition of the other transceiver is one out of a battery level of the other transceiver, a location of the other transceiver, a channel busy ratio, CBR, information, a channel state information, CSI.

6. Transceiver according to claim 1, wherein the sidelink control signal comprises a further information describing an operating condition of the transceiver, or wherein the transceiver is configured to transmit a further sidelink control signal comprising a further information describing an operating condition of the transceiver, wherein the operating condition of the transceiver is one out of a battery level of the transceiver, a location of the transceiver, a channel busy ratio, CBR, information, a channel state information, CSI.

7. Transceiver according to claim 1, wherein the transceiver is configured to transmit a control signal to the at least one other transceiver, the sidelink control signal comprising an information describing the discontinuous reception, DRX, cycle used by the transceiver and the sidelink control signal configured to control the at least one other transceiver to align the at least one other discontinuous reception, DRX, cycle to the discontinuous reception, DRX, used by the transceiver.

8. Transceiver according to claim 1, wherein the transceiver is configured to receive a control signal from the at least one other transceiver or from a base station of the wireless communication system, the control signal comprising an information describing the at least one other discontinuous reception, DRX, cycle used by the at least one other transceiver, wherein the transceiver is configured to adjust at least one parameter of its discontinuous reception, DRX, cycle in dependence on the information comprised in the control signal.

9. Transceiver according to claim 1, wherein the transceiver is configured to receive sidelink control signals from at least two other transceivers of the wireless communication system, each sidelink control signal comprising an information describing a respective discontinuous reception, DRX, cycle used by a respective transceiver of the at least two other transceivers, wherein the transceiver is configured to adjust at least one parameter of its discontinuous reception, DRX, cycle in dependence on the respective information comprised in the respective sidelink control signal.

10. Transceiver according to claim 1, wherein the transceiver is configured to receive a sidelink control signal from exactly one other transceiver of the wireless communication system, the sidelink control signal comprising an information describing a discontinuous reception, DRX, cycle used by the other transceiver, wherein the transceiver is configured to adjust at least one parameter of its discontinuous reception, DRX, cycle in dependence on the information comprised in the sidelink control signal.

11. Transceiver according to claim 1, wherein the transceiver is configured to align the discontinuous reception, DRX, cycle in dependence on a received control signal.

12. Transceiver according to claim 11, wherein the transceiver is configured to align a wake-up time of the discontinuous reception, DRX, cycle with the received control signal.

13. Transceiver according to claim 11, wherein the transceiver is configured to receive a control signal from the at least one other transceiver or a base station of the wireless communication system, the control signal comprising a control information describing a discontinuous reception, DRX, cycle to be used by the transceiver, wherein the transceiver is configured to set at least one parameter of its discontinuous reception, DRX, cycle in dependence on the control information.

14. Transceiver according to claim 1, wherein the transceiver is configured to adjust at least one parameter of its discontinuous reception, DRX, cycle in dependence on a received synchronization signal.

15. Transceiver according to claim 1, wherein the transceiver is configured to configure at least one parameter of the discontinuous reception, DRX, cycle in dependence on a control information received from a base station of the wireless communication system.

16. Transceiver according to claim 1, wherein the transceiver is configured to configure at least one parameter of the discontinuous reception, DRX, cycle in dependence on a sidelink control information received from another transceiver of the wireless communication system.

17. Transceiver according to claim 1, wherein the transceiver is configured to transmit a reporting signal, the reporting signal comprising an information describing a preferred discontinuous reception, DRX, cycle of the transceiver.

18. Method for operating a transceiver of a wireless communication system, the method comprising:

operating the transceiver in a sidelink in-coverage, out of coverage or partial coverage scenario, in which resources for a sidelink communication over a sidelink are pre-configured by the wireless communication system or allocated or scheduled autonomously by the transceiver, receiving, in the sidelink in-coverage, out of coverage or partial coverage scenario, sidelink signals from at least one other transceiver of the wireless communication system using a discontinuous reception, DRX, mode of operation, adjusting at least one parameter of a sidelink discontinuous reception, DRX, cycle describing periods during which sidelink signals are received in the discontinuous reception, DRX, mode of operation in dependence on at least one other discontinuous reception, DRX, cycle used by the at least one other transceiver, transmitting a sidelink control signal to the at least one other transceiver, the sidelink control signal comprising an information describing the discontinuous reception, DRX, cycle used by the transceiver, wherein the transceiver is a user equipment, wherein the discontinuous reception, DRX, cycle is aligned to the at least one other discontinuous reception, DRX, cycle used by the at least one other transceiver.

19. A non-transitory digital storage medium having a computer program stored thereon to perform the method for operating a transceiver of a wireless communication system, the method comprising:

operating the transceiver in a sidelink in-coverage, out of coverage or partial coverage scenario, in which resources for a sidelink communication over a sidelink are pre-configured by the wireless communication system or allocated or scheduled autonomously by the transceiver, receiving, in the sidelink in-coverage, out of coverage or partial coverage scenario, sidelink signals from at least one other transceiver of the wireless communication system using a discontinuous reception, DRX, mode of operation, adjusting at least one parameter of a sidelink discontinuous reception, DRX, cycle describing periods during which sidelink signals are received in the discontinuous reception, DRX, mode of operation in dependence on at least one other discontinuous reception, DRX, cycle used by the at least one other transceiver, transmitting a sidelink control signal to the at least one other transceiver, the sidelink control signal comprising an information describing the discontinuous reception, DRX, cycle used by the transceiver, wherein the discontinuous reception, DRX, cycle is aligned to the at least one other discontinuous reception, DRX, cycle used by the at least one other transceiver, wherein the transceiver is a user equipment, when said computer program is run by a computer.

* * * * *